United States Patent
Oshima et al.

(10) Patent No.: US 7,725,380 B2
(45) Date of Patent: *May 25, 2010

(54) COMMODITY SALES SYSTEM, USED ARTICLE QUOTATION SYSTEM, AND CORRESPONDING METHODS

(75) Inventors: Yasuhiro Oshima, Nagano-ken (JP); Takao Sekizawa, Nagano-ken (JP); Yasuo Shibusawa, Nagano-ken (JP); Yoshiyuki Aido, Nagano-ken (JP); Junji Suzuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1519 days.

This patent is subject to a terminal disclaimer.

(21) Appl. No.: 10/695,971

(22) Filed: Oct. 28, 2003

(65) Prior Publication Data
US 2004/0138911 A1 Jul. 15, 2004

(30) Foreign Application Priority Data
Oct. 28, 2002 (JP) ............................. 2002-312469
Oct. 28, 2002 (JP) ............................. 2002-312470

(51) Int. Cl.
*G06Q 40/00* (2006.01)
(52) U.S. Cl. .......................................... 705/37; 705/26
(58) Field of Classification Search ................... 705/26, 705/37
See application file for complete search history.

(56) References Cited

U.S. PATENT DOCUMENTS

| | | | |
|---|---|---|---|
| 5,978,776 A * | 11/1999 | Seretti et al. .................. | 705/26 |
| 6,941,305 B2 * | 9/2005 | Magouirk et al. .............. | 707/10 |
| 7,216,094 B2 * | 5/2007 | Ly et al. ........................ | 705/26 |
| 2001/0005833 A1 * | 6/2001 | Asami et al. ................... | 705/26 |
| 2002/0099628 A1 * | 7/2002 | Takaoka et al. ................ | 705/27 |
| 2003/0126062 A1 * | 7/2003 | Gilbert et al. ................. | 705/37 |
| 2003/0200151 A1 * | 10/2003 | Ellenson et al. .............. | 705/26 |
| 2004/0230504 A1 * | 11/2004 | Katada et al. ................. | 705/29 |
| 2007/0219868 A1 * | 9/2007 | Walker et al. ................. | 705/14 |

FOREIGN PATENT DOCUMENTS

| JP | 2002-041878 | 2/2002 |
|---|---|---|
| JP | 2002-117134 | 4/2002 |

(Continued)

OTHER PUBLICATIONS

Edmunds car buying guide: New car prices, used car pricing, auto reviews, www.edmunds.com, web archives, pp. 1-13.*

(Continued)

*Primary Examiner*—Hani Kazimi
*Assistant Examiner*—Bijendra K Shrestha
(74) *Attorney, Agent, or Firm*—Martine Penilla & Gencarella, LLP

(57) ABSTRACT

A commodity sales system includes at least one server computer including a memory system, a commodity price specification module for receiving a purchase request of a selected commodity from the user computer and for specifying a commodity price of the selected commodity. A storage module that stores a component price table and a maximum/minimum price determination module are also included. A deduction setting module and a tentative quote setting module for setting the minimum price determined by the maximum/minimum price determination module to a tentative quote of the used personal computer are also included.

6 Claims, 23 Drawing Sheets

FOREIGN PATENT DOCUMENTS

| JP | 2002-222331 | 8/2002 |
|---|---|---|
| JP | 2002-297750 | 10/2002 |
| JP | 2002-312466 | 10/2002 |

OTHER PUBLICATIONS

HP: About hp trade-in overview, www.hp.com, web archives, pp. 1-6.*

Abstract of Japanese Patent Publication No. 2002-312466, Pub. Date: Oct. 25, 2002, Patent Abstracts of Japan.

Abstract of Japanese Patent Publication No. 2002-041878, Pub. Date: Feb. 8, 2002, Patent Abstracts of Japan.

Abstract of Japanese Patent Publication No. 2002-117134, Pub. Date: Apr. 19, 2002, Patent Abstracts of Japan.

Abstract of Japanese Patent Publication No. 2002-222331, Pub. Date: Aug. 9, 2002, Patent Abstracts of Japan.

Abstract of Japanese Patent Publication No. 2002-297750, Pub. Date: Oct. 11, 2002, Patent Abstracts of Japan.

"Purchasing Used Computers," *Monthly Computer Digest*, Jun. 29, 2006, vol. 28, No. 7, p. 22, Toho Press, Inc. (with English translation).

Dell Computer Corporation Web Page, "Dell PC Trade-Up Service" (http://www.dell.com/html/jp/jpn/dhs/kaitori.htm), Sep. 1, 2002.

* cited by examiner

FIG.2

| Componentes | Classes | Values |
|---|---|---|
| CPUs | Pentium166MHz or below | ¥ XXXX |
| | Pentium2 300MHz or below | ¥ XXYY |
| | Pentium2 450MHz or below | ¥ YYYY |
| | ⋮ | ⋮ |
| Memories | No Memory | ¥ 0 |
| | 64MB or less | ¥ ZZZ |
| | 128MB or less | ¥ ZZY |
| | ⋮ | ⋮ |
| HDDs | No HDD | ¥ 0 |
| | 10GB or less | ¥ WWW |
| | 40GB or less | ¥ WWY |
| | ⋮ | ⋮ |

*) Pentium is the registered trademark of Intel Corp.
The symbol X, Y, Z and W represent numerals or characters.

FIG.3

| Commodity Name | Commodity Price |
|---|---|
| Laptop PC/AA | ¥200,000 |
| Laptop PC/BB | ¥160,000 |
| Desktop PC/CC | ¥220,000 |
| Desktop PC/DD | ¥200,000 |

FIG.5

Quotation Requirement Information Input Window

Enter components of your personal computer.

| | |
|---|---|
| CPU | ▼ |
| Memory | ▼ |
| HDD | ▼ |
| CD-ROM | ▼ |
| FD | ▼ |
| LAN Card | ▼ |
| Instructions Manual | ▼ |
| Package | ▼ |

| Tentative Quote Ppr | | Requirement of Assessment | Trade-in Quote Pest | Deduction D |
|---|---|---|---|---|
| Ppr>P1 | | Required | Pest←Pmin~Pmax | D←Pmin |
| P1≧Ppr | P1≧Ppr>P2 | Non-required | Pest←f(Ppr) | D←Pest(=f(Ppr)) |
| | P2≧Ppr | | Pest←C | D←Pest(=C) |

FIG.8

(a)
Quotation Window

Your used personal computer is quoted as:

Trade-in Quote    Min. ¥ 30, 000 ~ Max. ¥ 40, 000

Notandum
1. The trade-in quote represents a quote with purchase of a new commodity.
2. The final trade-in price will be determined in the range of the minimum value and the maximum value after the system makes an assessment of the used article.
3. Any malfunctioning used article is not the subject of trade-in.
4. The proprietary right to the used article is automatically transferred to the system at the time when the used article is delivered to the system.

( Trade-in Request )    ( Cancel )

(b)
Quotation Window

Your used personal computer is quoted as:

Trade-in Quote    Settled Price ¥ 7, 500

Notandum
1. The trade-in quote represents a quote with purchase of a new commodity.
2. The final trade-in price is settled as the trade-in quote. No assessment will be carried out.
3. ····

(c)
Quotation Window

Your used personal computer is quoted as:

Trade-in Quote    Settled Price ¥ 5, 000

Notandum
1. The trade-in quote represents a quote with purchase of a new commodity.
2. The final trade-in price is settled as the trade-in quote. No assessment will be carried out.
3. ····

FIG.11

Check Window

| Name of Commodity for Purchase | Laptop PC/AA |
|---|---|
| Price of Commodity | ¥ 200, 000 |
| Subject of Trade-in | Personal Computer<br>CPU : × × 、Clock250MHz<br>Memory : 64MB<br>HDD : 5GB<br>⋯⋯ |
| Trade-in Quote | Min.¥ 30, 000 ~ Max.¥ 40, 000 |

Amount Payable  ¥ 200, 000 − ¥ 30, 000 = ¥ 170, 000

Notandum
1. The final trade-in price will be determined in the range of the minimum value and the maximum value after the system makes an assessment of the used article.
2. When the final trade-in price exceeds the minimum value, the difference will be paid back.
3. Any malfunctioning used article is not the subject of trade-in.
4. The proprietary right to the used article is automatically transferred to the system at the time when the used article is delivered to the system.

( OK )   ( Cancel )

FIG.12

Purchase Requirement Information Input Window

User's Postal Address

User's Name

User's Telephone Number

User's Mail Address

Delivery Address of Products = User's Address?   ◯Yes  ◯No

Delivery Address of Commodities

Telephone Number of Delivery Address

Date and Time of Delivery

Send

FIG.13

Trade-in Requirement Information Input Window

Pickup Address of Used Article = User's Address?   ○Yes  ○No
Pickup Address of Used Article = Delivery Address of Products?  ○Yes  ○No Pickup Address of Used Article Telephone Number of Pickup Address Date and Time of Pickup Remittance Address of Trade-in Money Send

USED ARTICLE QUOTATION SYSTEM 50

FIG.16

| Componentes | Classes | Values |
|---|---|---|
| CPUs | Pentium166MHz or below | ¥ XXXX |
| | Pentium2 300MHz or below | ¥ XXYY |
| | Pentium2 450MHz or below | ¥ YYYY |
| | ⋮ | ⋮ |
| Memories | No Memory | ¥ 0 |
| | 64MB or less | ¥ ZZZ |
| | 128MB or less | ¥ ZZY |
| | ⋮ | ⋮ |
| HDDs | No HDD | ¥ 0 |
| | 10GB or less | ¥ WWW |
| | 40GB or less | ¥ WWY |
| | ⋮ | ⋮ |

∗) Pentium is the registered trademark of Intel Corp.
The symbol X, Y, Z and W represent numerals or characters.

FIG.19

```
Quotation Requirement Information

CPU／Pentium2  300MHz

Memory／64MB

HDD／40GB

CD-ROM／CD-RW

FD／Exist

LAN Card／Exist

OS／Windows98
```

FIG.21

Quotation Window

Your used personal computer is quoted as:

Cash-out Quote:   Min. ¥25,000 - Max. ¥35,000

Trade-in Quote:   Min. ¥30,000 - Max. ¥40,000

Notandum

1. The cash-out quote represents a quote without purchase of any new product, and the trade-in quote represents a quote with purchase of a new product.
2. Any malfunctioning used article is not the subject of cash-out or trade-in.
3. The final cash-out price and the final trade-in price will be determined in the respective ranges of minimum values and the maximum values after the system makes an assessment of the used article.
4. The proprietary right to the used article is automatically transferred to the system at the time when the used article is delivered to the system.

( Cash-out Request )   ( Trade-in Request )   ( Cancel )

FIG.23

Quotation Window

Your used personal computer is quoted as:

Trade-in Quote:   ¥5,000

Notandum
1. The current used article is poorly evaluated and is not the subject of cash-out without purchase of any new product but is only the subject of trade-in with purchase of a new product.
2. Any malfunctioning used article is not the subject of trade-in.
3. The proprietary right to the used article is automatically transferred to the system at the time when the used article is delivered to the system.

( Trade-in Request )   ( Cancel )

COMMODITY SALES SYSTEM, USED ARTICLE QUOTATION SYSTEM, AND CORRESPONDING METHODS

BACKGROUND OF THE INVENTION

1. Field of the Invention

The present invention relates to a commodity sales system that is connected with a user computer in a communicable manner and is used when a user purchases a commodity, and a corresponding commodity sales method, as well as a used article quotation system that provides a user computer with a quote for acceptance of a used article from a user, and a corresponding used article quotation method.

2. Description of the Prior Art

Several systems have been proposed to provide a user with a quote for acceptance of a used article from a user. For example, Dell PC Trade-Up Service (online service by Dell Computer Corporation [retrieved on Sep. 1, 2002], Internet <URL: http://www.dell.com/jp/jp/dhs/topics/nnsegtopic_kaitori.htm>) gives computer trade-in service subjected to users who intend to purchase new products. When the user enters information regarding the specification of a used computer owned by the user, such as the specifications of the CPU, the memory, and the HDD, on an information input window and gives a quotation request, the server computer provides the user with a trade-in quote of the used computer.

The computer trade-in service 'Dell PC Trade-Up Service', the system is not designed to allow for information exchange between a shopping site where the user newly purchases commodities and a trade-in site where a used article is taken as a trade-in. The user should thus carry out the procedure of paying the purchase price of each commodity separately from the procedure of receiving the trade-in price of the used article. Namely the prior art computer trade-in service system s not sufficiently user friendly. The user with little computer-related knowledge has difficulties in entering information on the specifications of the used computer, for example, the specifications of the CPU, the memory, and the HDD included in the used computer.

SUMMARY OF THE INVENTION

The object of the invention is thus to provide a user friendly commodity sales system that takes used articles as a trade-in simultaneously with selling commodities selected by the user, as well as a method and a program corresponding thereto.

In order to achieve the above object, a commodity sales system and a corresponding method of the present invention are structured as follows.

A commodity sales system of the present invention is a system that is connected with a user computer in a communicable manner and is used when a user purchases a commodity, the commodity sales system including: a commodity price specification module that receives a purchase request of a selected commodity from the user computer and specifies a commodity price of the selected commodity; a quote determination module that receives a trade-in request of a used article and quotation requirement information, which is required for quotation of the used article, from the user computer and determines a trade-in quote of the used article, based on the received quotation requirement information; a deduction setting module that sets a deduction of the selected commodity, which is to be subtracted from the specified commodity price of the selected commodity, according to the trade-in quote of the used article thus determined; a difference calculation module that subtracts the setting of the deduction from the specified commodity price of the selected commodity to calculate a difference; and an amount payable notification module that notifies the user computer of the calculated difference as an amount payable.

The commodity sales system of the invention receives a purchase request of a selected commodity from the user computer and specifies a commodity price of the selected commodity. The commodity sales system also receives a trade-in request of a used article and quotation requirement information, which is required for quotation of the used article, from the user computer and determines a trade-in quote of the used article, based on the received quotation requirement information. The commodity sales system sets a deduction of the selected commodity, which is to be subtracted from the specified commodity price of the selected commodity, according to the trade-in quote of the used article thus determined, subtracts the setting of the deduction from the specified commodity price of the selected commodity to calculate a difference, and notifies the user computer of the calculated difference as an amount payable (by transmission). The commodity sales system of the invention automatically subtracts the setting of the deduction from the specified commodity price of the selected commodity and sends the calculated difference as the amount payable to the user. This arrangement simplifies the whole procedures, compared with a prior art system that requires the user to separately pay the purchase price of the selected commodity and receive the trade-in price of the used article. Namely the arrangement of the invention ensures the user-friendly sales of commodities and trade-in of used articles.

In the specification hereof, the terminology 'trade-in of the used article' means that the system accepts the used article under the condition that the user newly purchases one or multiple commodities. The terminology 'used article' in the specification hereof represents an article that is not brand new and includes an article that has not been used at all but has become old with elapse of time, as well as an article that has been used for some time.

In the commodity sales system of the invention, the quote determination module, in response to receipt of the trade-in quote of the used article and the quotation requirement information, which is required for quotation of the used article, may specify a tentative quote of the used article based on the quotation requirement information, compare the specified tentative quote with a predetermined reference value, and determine either a price having a value range or a price having no value range as the trade-in quote of the used article according to a result of the comparison, and the deduction setting module may set the deduction of the selected commodity corresponding to a minimum value in the value range of the price when the price having the value range is determined as the trade-in quote of the used article, while setting the deduction of the selected commodity corresponding to the price having no value range when the price having no value range is determined as the trade-in quote of the used article. In this case, the predetermined reference value may be used to determine whether an assessment of the used article is required to settle a final trade-in price of the used article. Further in this case, the deduction setting module may set the deduction of the selected commodity corresponding to the minimum value in the value range of the price, and when a final trade-in price settled after an assessment of the used article exceeds the minimum value, the amount payable notification module may notify the user computer of a refund corresponding to a difference between the final trade-in price and the minimum value, together with the amount payable. Further in this case, the quote determination module, in the case where the price having no value range is determined as the trade-in quote of the used article, based on the result of the comparison between the tentative quote and the predetermined reference value, may determine either a settled price having no value range, which depends upon the tentative quote, as the trade-in quote of the used article or a preset fixed price, which does not depend upon the tentative quote, as the trade-in quote of the used article according to a value level of the tentative quote.

In the commodity sales system of the present invention, the deduction setting module, in the case where the quote determination module determines trade-in quotes of multiple used articles, may set a total deduction of the selected commodity, which is to be subtracted from the specified commodity price of the selected commodity, according to a sum of the trade-in quotes of the multiple used articles or a sum of deductions set for the respective used articles.

The commodity sales system of the invention may include an adjustment module that adjusts the difference calculated by the difference calculation module to be not less than a predetermined value. In this case, the adjustment module may include a transmission sub-module that is activated to send the user computer a message showing that the trade-in request of the used article is not acceptable, instead of the amount payable notification module. The 'message showing that the trade-in request of the used article is not acceptable' is, for example, a message showing that the number of used articles for a trade-in is limited because of an excess trade-in discount or a message showing that some of multiple used articles are not the subject of a trade-in but are cashed out because of an excess trade-in discount. Here the cash-out represents acceptance of a used article without purchase of any commodity, and the cash-out price is generally set lower than the trade-in price.

A commodity sales method of the present invention is a method that is carried out when a user purchases a selected commodity, the commodity sales method including the steps of: (a) causing a server computer to receive a purchase request of a selected commodity from the user computer and specify a commodity price of the selected commodity; (b) causing the server computer to receive a trade-in request of a used article and quotation requirement information, which is required for quotation of the used article, from the user computer and determine a trade-in quote of the used article, based on the received quotation requirement information; (c) causing the server computer to set a deduction of the selected commodity, which is to be subtracted from the specified commodity price of the selected commodity, according to the trade-in quote of the used article thus determined; (d) causing the server computer to subtract the setting of the deduction from the specified commodity price of the selected commodity to calculate a difference; and (e) causing the server computer to notify the user computer of the calculated difference as an amount payable.

The commodity sales method of the invention receives a purchase request of a selected commodity from the user computer and specifies a commodity price of the selected commodity. The commodity sales method also receives a trade-in request of a used article and quotation requirement information, which is required for quotation of the used article, from the user computer and determines a trade-in quote of the used article, based on the received quotation requirement information. The commodity sales method sets a deduction of the selected commodity, which is to be subtracted from the specified commodity price of the selected commodity, according to the trade-in quote of the used article thus determined, subtracts the setting of the deduction from the specified commodity price of the selected commodity to calculate a difference, and notifies the user computer of the calculated difference as an amount payable (by transmission). The commodity sales method of the invention automatically subtracts the setting of the deduction from the specified commodity price of the selected commodity and sends the calculated difference as the amount payable to the user. This arrangement simplifies the whole procedures, compared with a prior art that requires the user to separately pay the purchase price of the selected commodity and receive the trade-in price of the used article. Namely the arrangement of the invention ensures the user-friendly sales of commodities and trade-in of used articles.

In the commodity sales method of the invention, the step (c) may set the deduction to be not less than a preset support price.

In the commodity sales method of the invention, the step (b), in response to receipt of the trade-in quote of the used article and the quotation requirement information, which is required for quotation of the used article, may specify a tentative quote of the used article based on the quotation requirement information, compare the specified tentative quote with a predetermined reference value, and determine either a price having a value range or a price having no value range as the trade-in quote of the used article according to a result of the comparison, and the step (c) may set the deduction of the selected commodity corresponding to a minimum value in the value range of the price when the price having the value range is determined as the trade-in quote of the used article, while setting the deduction of the selected commodity corresponding to the price having no value range when the price having no value range is determined as the trade-in quote of the used article. In this case, the predetermined reference value may be used to determine whether an assessment of the used article is required to settle a final trade-in price of the used article. Further in this case, the step (c) may set the deduction of the selected commodity corresponding to the minimum value in the value range of the price, and when a final trade-in price settled after an assessment of the used article exceeds the minimum value, the step (e) may notify the user computer of a refund corresponding to a difference between the final trade-in price and the minimum value, together with the amount payable. Further in this case, the step (b), in the case where the price having no value range is determined as the trade-in quote of the used article, based on the result of the comparison between the tentative quote and the predetermined reference value, may determine either a settled price having no value range, which depends upon the tentative quote, as the trade-in quote of the used article or a preset fixed price, which does not depend upon the tentative quote, as the trade-in quote of the used article according to a value level of the tentative quote.

In the commodity sales method of the invention, the step (c), in the case where the step (b) determines trade-in quotes of multiple used articles, may set a total deduction of the selected commodity, which is to be subtracted from the specified commodity price of the selected commodity, according to a sum of the trade-in quotes of the multiple used articles or a sum of deductions set for the respective used articles.

In the commodity sales method of the invention, the step (d) may adjust the calculated difference to be not less than a predetermined value. In this case, when the step (d) adjusts the calculated difference to be not less than the predetermined value, the step (d) may further send the user computer a message showing that the trade-in request of the used article is not acceptable, instead of execution of the step (e).

The object of the invention is also to provide a used article quotation system that enables even a user with little computer-related knowledge to be readily informed of a quote of a used article, as well as a method and a program corresponding thereto.

In order to achieve the above object, a used article quotation system and a corresponding used article quotation method are structured as follows.

A used article quotation system of the present invention is a system that provides a user computer with a quote for acceptance of a used article from a user, the used article quotation system including: a quotation requirement information acquisition module that, in response to receipt of a request for quotation of the user computer itself, which has been sent from the user computer, causes the user computer to automatically read out quotation requirement information, which is required for quotation of the user computer, and acquires the quotation requirement information from the user computer; a quote determination module that determines a quote of the user computer, based on the acquired quotation requirement information; and a quotation information transmission module that sends quotation information, which includes the quote of the user computer determined by the quote determination module, to the user computer.

In response to receipt of a request for quotation of the user computer itself, which has been sent from the user computer, the used article quotation system of the invention causes the user computer to automatically read out the quotation requirement information, which is required for quotation of the user computer, and subsequently acquires the quotation requirement information from the user computer. The used article quotation system then determines the quote of the user computer based on the acquired quotation requirement information, and sends the quotation information including the quote of the user computer to the user computer. Namely the used article quotation system of the invention determines the quote of the user computer, based on the quotation requirement information automatically read by the user computer. This arrangement enables even the user with little knowledge of the quotation requirement information, that is, the user with little computer-related knowledge, to be readily informed of the quote of the user computer.

In the specification hereof, the terminology 'acceptance of the used article' includes both a trade-in that the system accepts the used article when the user purchases one or multiple commodities and a cash-out that the system accepts the used article when the user does not purchase any commodity.

In the used article quotation system of the invention, the quotation requirement information acquisition module may acquire information regarding each component of the user computer as the quotation requirement information. In this case, the information regarding each component of the user computer may include at least a class of a CPU, a capacity of a memory, and a capacity of a hard disk. In this case, further, the used article quotation system of the invention may include a component price storage module that stores a mapping of a component price to each component of the user computer, and the quote determination module may read the component price of each component of the user computer from the component price storage module, based on the information regarding each component of the user computer acquired by the quotation requirement information acquisition module, and determine the quote of the user computer according to a sum of the component prices.

In one preferable application of the used article quotation system of the invention, in response to receipt of a request for quotation of the user computer itself, which has been sent from the user computer, the quotation requirement information acquisition module sends back a program, which causes the user computer to read out the quotation requirement information, to the user computer and subsequently acquires the quotation requirement information from the user computer. This program may take advantage of a JAVA (the registered trademark by Sun Microsystems Inc.) applet or ActiveX (the registered trademark by Microsoft Corporation). The program may utilize a file for recording information regarding each component of the user computer as the quotation requirement information or a control program for controlling each component of the user computer and thereby cause the user computer to read out the information regarding each component of the user computer. A typical example of such a file is a registry (that is, a database for central control of the setting information with regard to the computer) in the operating system of Windows 95 (the registered trademark by Microsoft Corporation) or a later version. A typical example of the control program is Basic Input Output System (BIOS, a program for controlling devices connecting with the computer).

In the used article quotation system of the invention, the quote determination module may determine a trade-in quote when the acceptance of the user computer is a trade-in with purchase of a commodity and a cash-out quote when the acceptance of the user computer is a cash-out without purchase of any commodity, based on the quotation requirement information acquired by the quotation requirement information acquisition module.

A used article quotation method of the present invention is a method that provides a user computer with a quote for acceptance of a used article from a user, the used article quotation method including: (a) causing a server computer, in response to receipt of a request for quotation of the user computer itself, which has been sent from the user computer, to acquire the quotation requirement information which is required for quotation of the user computer, from the user computer; (b) causing the server computer to determine a quote of the user computer, based on the acquired quotation requirement information; and (c) causing the server computer to send quotation information, which includes the quote of the user computer.

In response to receipt of a request for quotation of the user computer itself, which has been sent from the user computer, the used article quotation method of the invention causes the user computer to automatically read out the quotation requirement information, which is required for quotation of the user computer, and subsequently acquires the quotation requirement information from the user computer. The used article quotation method then determines the quote of the user computer based on the acquired quotation requirement information, and sends the quotation information including the quote of the user computer to the user computer. Namely the used article quotation method of the invention determines the quote of the user computer, based on the quotation requirement information automatically read by the user computer. This arrangement enables even the user with little knowledge of the quotation requirement information, that is, the user with little computer-related knowledge, to be readily informed of the quote of the user computer.

In the used article quotation method of the invention, the step (a) may acquire information regarding each component of the user computer as the quotation requirement information. In this case, the information regarding each component of the user computer may include at least a class of a CPU, a capacity of a memory, and a capacity of a hard disk. Further in this case, the step (b) may read a component price of each component of the user computer from a component price storage module, which stores a mapping of a component price to each component of the user computer, based on the information regarding each component of the user computer acquired in the step (a), and determine the quote of the user computer according to a sum of the component prices.

In the used article quotation method of the invention, the step (a), in response to receipt of the request for quotation of the user computer itself, which has been sent from the user computer, may send back a program, which causes the user computer to read out the quotation requirement information, to the user computer and subsequently acquire the quotation requirement information from the user computer. The program may utilize either of a file for recording information regarding each component of the user computer as the quotation requirement information or a control program for controlling each component of the user computer and thereby causes the user computer to read out the information regarding each component of the user computer.

In the used article quotation method of the invention, the step (b) may determine a trade-in quote when the acceptance of the user computer is a trade-in with purchase of a commodity and a cash-out quote when the acceptance of the user computer is a cash-out without purchase of any commodity, based on the quotation requirement information acquired by the step (a).

BRIEF DESCRIPTION OF THE DRAWINGS

FIGS. 1 through 14 illustrate a first embodiment;
FIG. 1 schematically illustrates the construction of a server system in one embodiment of the invention;
FIG. 2 shows a component price table stored in a data storage device;
FIG. 3 shows a commodity price table stored in a data storage device;
FIG. 4 shows a time-series process of communication in a used article quotation site;
FIG. 5 shows one example of a quotation requirement information input window;
FIG. 6 is a flowchart showing a quotation window creation routine;
FIG. 7 shows a mapping of a level of the tentative quote to requirement of assessment and a trade-in quote, as well as to a deduction;
FIG. 8 shows one example of a quotation window;
FIG. 9 shows a time-series process of communication in a shopping site;
FIG. 10 is a flowchart showing an amount payable calculation routine;
FIG. 11 shows one example of a check window;
FIG. 12 shows one example of a purchase requirement information input window;
FIG. 13 shows one example of a trade-in requirement information input window;
FIG. 14 shows a time-series process of communication in each site;
FIGS. 15 through 23 illustrate a second embodiment;
FIG. 15 schematically illustrates the construction of a used article quotation system in one embodiment of the invention;
FIG. 16 shows a component price table stored in a data storage device;
FIG. 17 shows a time-series process of communication;
FIG. 18 is a flowchart showing a quotation requirement information acquisition program;
FIG. 19 shows one example of a quotation requirement information;
FIG. 20 is a flowchart showing a quotation window creation routine; and
FIGS. 21 through 23 show examples of a quotation window.

DESCRIPTION OF THE PREFERRED EMBODIMENTS

First Embodiment

Figure 1:
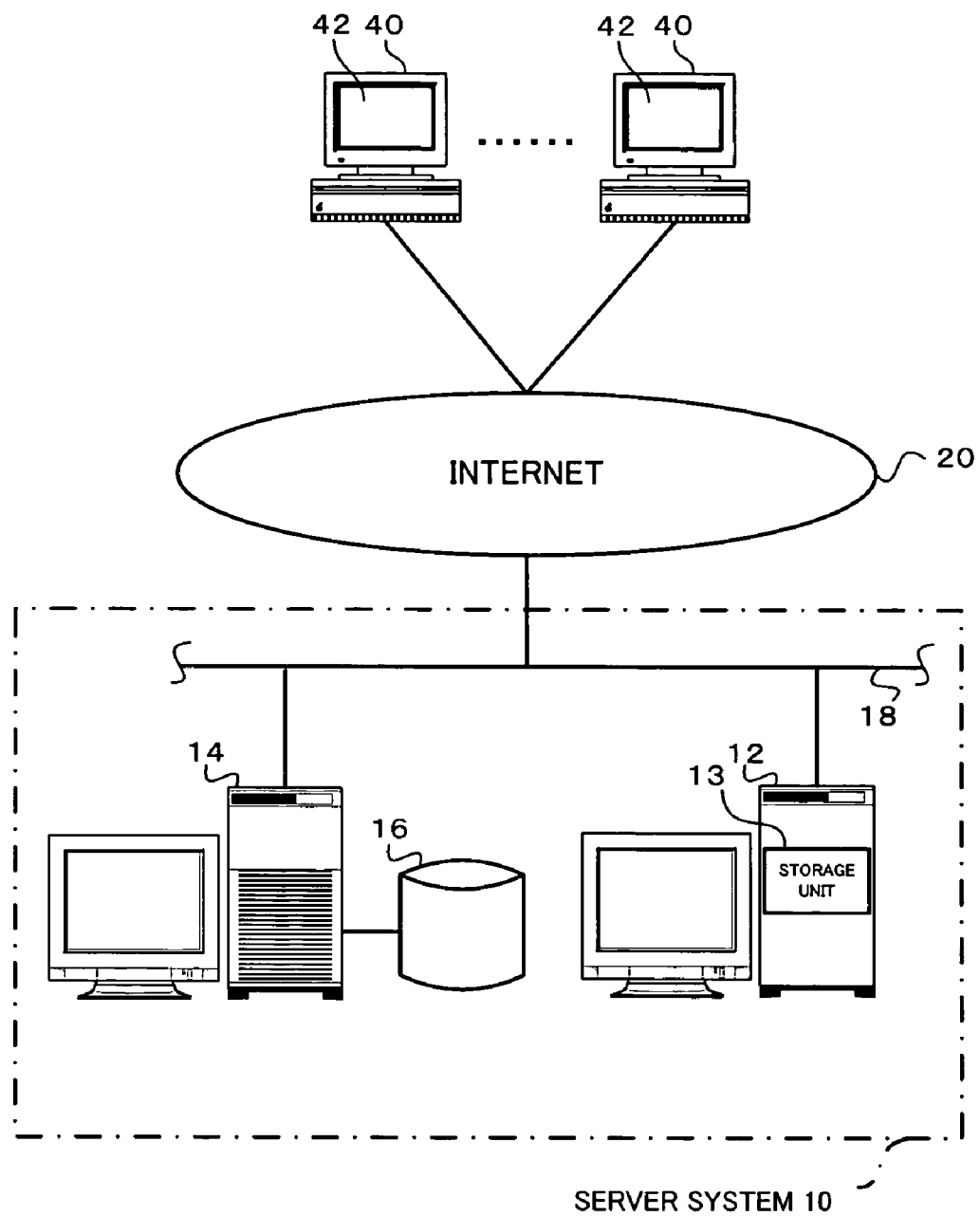

A first embodiment of the invention is discussed below with reference to the accompanied drawings. FIG. 1 schematically illustrates the construction of a server system 10 in one embodiment of the invention, and FIG. 2 shows a database stored in a data storage device 16 connecting with a database server 14 in the server system 10 of FIG. 1.

The server system 10 of this embodiment includes a Web server 12 and a database server 14, which are mutually connected in a communicable manner via a network cable 18. In the specification hereof, the terminology 'trade-in' represents acceptance of a user's used article on the condition of the user's purchase of a new commodity.

The Web server 12 executes a diversity of programs stored in an internal storage unit 13 and thereby functions as a server to open a used article quotation site that provides a trade-in quote of each used personal computer owned by each user or as a server to open a shopping site that sells new personal computers. The Web server 12 works as a contact for requests from user computers 40 connecting with the Internet 20. The Web server 12 functions to receive a request from each of the user computers 40, to make a reply to the request, and to transmit the reply to the user computer 40. The Web server 12 also functions to receive quotation requirement information from each of the user computers 40, to transfer the received quotation requirement information to the database server 14, to activate the database server 14 for computation of a trade-in quote, to receive a result of the computation, to make a reply based on the received computation result, and to transfer the reply to the user computer 40. Here the quotation requirement information represents information on classes and performances of components constituting used personal computers, as discussed in detail later.

A data storage device 16 is connected to the database server 14 and stores a component quote table, in which component names and respective classes of components included in used personal computers are mapped to values, as shown in FIG. 2. The components of the used personal computers are grouped by the component names, such as CPUs, memories, HDDs, FDDs CD-ROMs, LAN cards, instruction manuals, and packages. The CPUs are further classified into classes by the name of the processor and the clock frequency, and the values are set for the respective classes. The memories and the HDDs are classified into classes by their capacities, and the values are set for the respective classes. Although not being specifically illustrated, the CD-ROMs are classified into classes by the function (for example, a DVD readable function or a DVD writable function), and the values are set for the respective classes. The values of the FDDs, the LAN cards, the instruction manuals, and the packages do not depend upon their classes but are set according to their presence or absence. The data storage device 16 stores a commodity price table, which represents the mapping of the name of each commodity on sale to its price, as shown in FIG. 3.

The database server 14 is connected with the data storage device 16. The database server 14 functions to retrieve the component price table (see FIG. 2) stored in the data storage device 16, based on the quotation requirement information regarding each used personal computer, which has been received from each of the user computers 40 via the Web server 12, to compute a total value of respective used components as a minimum trade-in quote Pmin, and to transfer the computed minimum trade-in quote Pmin to the Web server 12. The database server 14 also functions to retrieve the commodity price table (see FIG. 3) stored in the data storage device 16 in response to an inquiry request for the commodity price received from the Web server 12 and to transfer the retrieved commodity price to the Web server 12.

The user computer 40 is a known general-purpose personal computer used by either an individual or a legal entity. The user computer 40 utilizes a Web browser installed therein to gain access to the used article quotation site and the shopping site opened by the Web server 12 via the Internet 20. The user computer 40 makes various pieces of information shown on the display 42.

Figure 4:
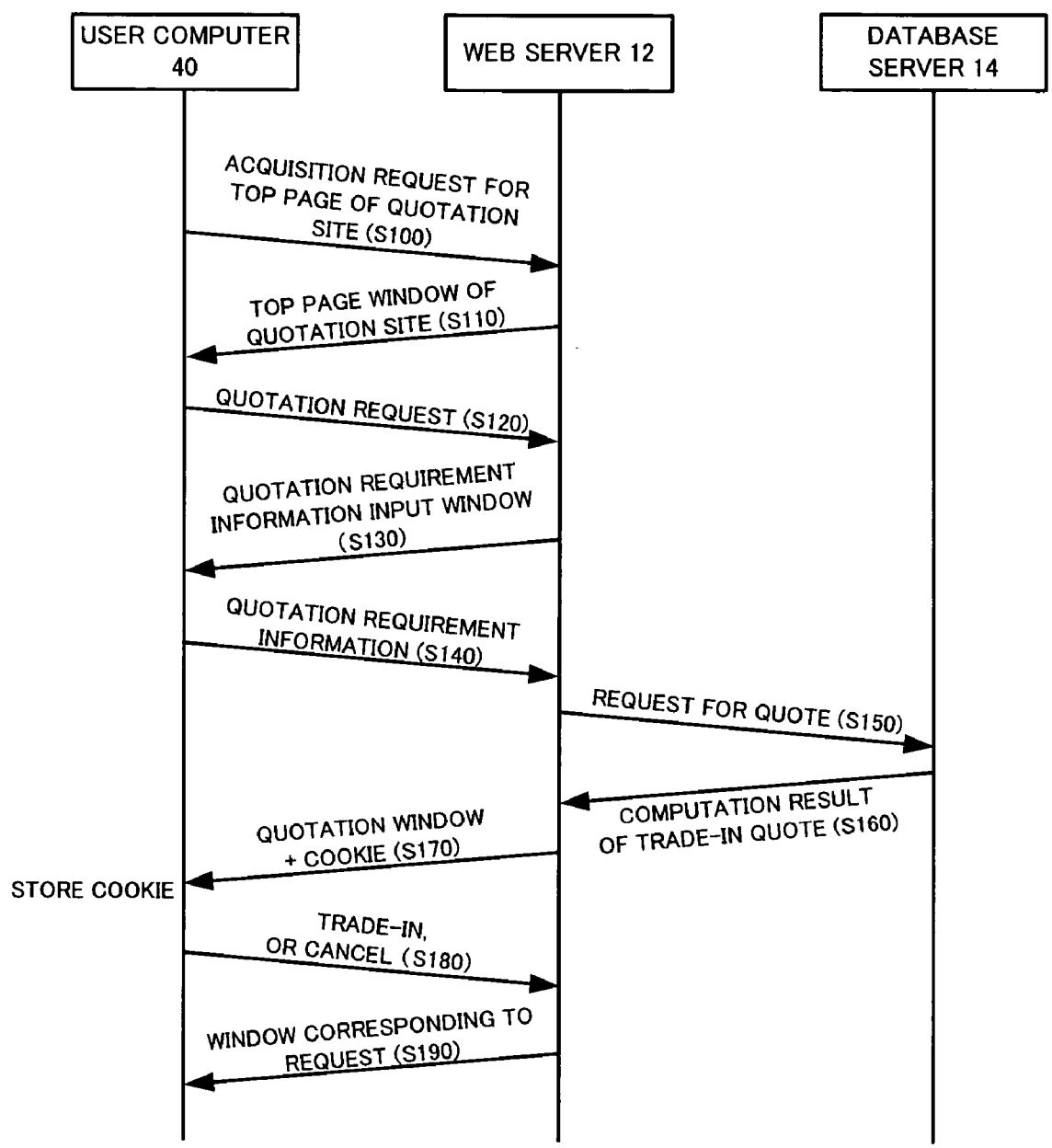

The server system 10 of this embodiment works as discussed below, when functioning to open the used article quotation site. FIG. 4 shows a time series process of communication between the Web server 12, the database server 14, and the user computer 40.

The user activates the Web browser on the user computer 40 and inputs a URL (Uniform Resource Locator) of the used article quotation site opened by the Web server 12. The user computer 40 then sends an acquisition request for a top page of the used article quotation site to the Web server 12 via the Internet 20 (step S100). The Web server 12 receives the acquisition request and transmits a top page window (not shown) of the used article quotation site to the user computer 40 via the Internet 20 (step S110). The user computer 40 opens the received top page window of the used article quotation site on the display 42.

When the user clicks a request button for a trade-in quotation provided on the top page window of the used article quotation site, the user computer 40 sends a request for a trade-in quotation to the Web server 12 via the Internet 20 (step S120). The Web server 12 receives the quotation request and transmits a quotation requirement information input window to the user computer 40 via the Internet 20 (step S130). The user computer 40 opens the received quotation requirement information input window on the display 42. Here the quotation requirement information is information required for trade-in quotation of each used personal computer and represents information on the respective components of each used personal computer. FIG. 5 shows an example of the quotation requirement information input window. In this illustrated example, the user opens respective pull-down menus and selects entries of the processor name and the clock frequency for the CPU, of the capacities for the memory and the HDD, of the function (for example, a DVD readable function or a DVD writable function) for the CD-ROM, and of the presence or absence for the FDD, the LAN card, the instructions manual, and the package.

The user inputs information regarding the respective components on quotation requirement information input window and clicks an 'OK' button provided on the quotation requirement information input window (see FIG. 5). The user computer 40 then transmits the quotation requirement information to the Web server 12 via the Internet 20 (step S140). The Web server 12 receives the transmitted quotation requirement information and sends the quotation requirement information and a request signal for trade-in quote to the database server 14 (step S150). The database server 14 receives the request signal for trade-in quote and the quotation requirement information, refers to the component price table (see FIG. 2) stored in the data storage device 16 based on the quotation requirement information, and computes the minimum trade-in quote Pmin. The concrete procedure of computation reads the value mapped to the processor name of the CPU and the clock frequency, the value mapped to the capacity of the memory, the value mapped to the capacity of the HDD, and the other additional values from the component price table shown in FIG. 2 and calculates the total of these values of the components according to Equation 1 given below as the minimum trade-in quote Pmin:

$$P\text{min} = \Sigma(\text{Values of Components}) \quad \text{[Equation 1]}$$

Figure 6:
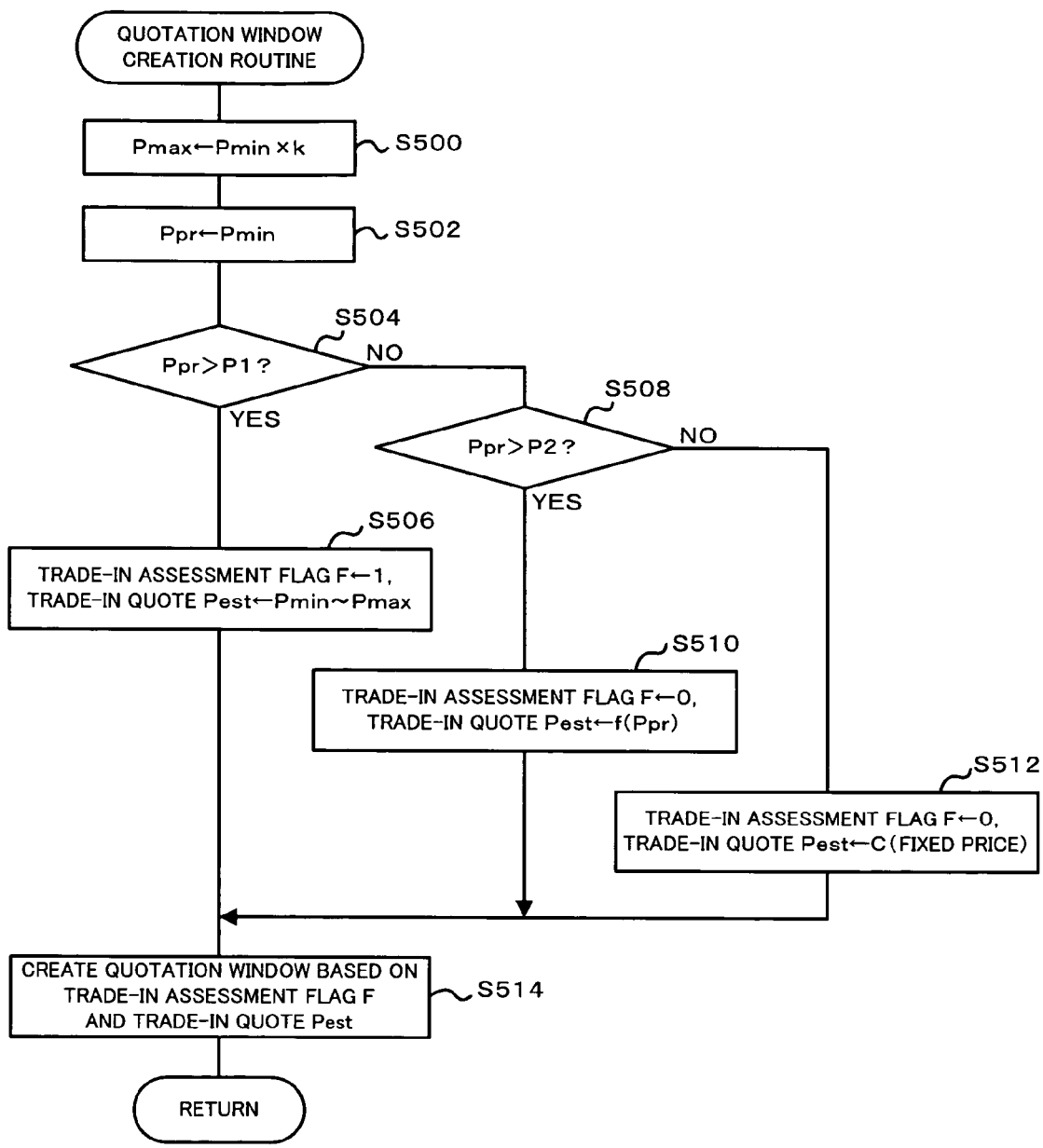

After computation of the minimum trade-in quote Pmin, the database server 14 transmits the computed minimum trade-in quote Pmin to the Web server 12 (step S160). The Web server 12 receives the transmitted minimum trade-in quote Pmin from the database server 14, and executes a quotation window creation routine shown in the flowchart of FIG. 6. When the quotation window creation routine starts, the Web server 12 first calculates a maximum trade-in quote Pmax from the minimum trade-in quote Pmin received from the database server 14 (step S500). One example of an equation used for calculating the maximum value Pmax is given as Equation 2 below:

$$P\text{max} = P\text{min} \times k \quad \text{[Equation 2]}$$

where k is a constant exceeding a value '1'.

The Web server 12 sets the minimum trade-in quote Pmin to a tentative quote Ppr (step S502) and compares the tentative quote Ppr with a threshold value P1 (step S504). The threshold value P1 is set as an assessment requirement judgment value. When the tentative quote Ppr exceeds the threshold value P1, the final trade-in price is determined according to the result of an assessment of the used personal computer. When the tentative quote Ppr is not greater than the threshold value P1, on the other hand, the final trade-in price is determined without assessment of the used personal computer. When the tentative quote Ppr exceeds the threshold value P1 at step S504, a trade-in assessment flag F is set equal to a value '1', which represents requirement of an assessment for determination of the final trade-in price, and a trade-in quote Pest is set to have a value range between the minimum trade-in quote Pmin and the maximum trade-in quote Pmax (step S506). In this case, the final trade-in price is determined in the range from the minimum trade-in quote Pmin to the maximum trade-in quote Pmax, based on assessment of the used personal computer.

When the tentative quote Ppr is not greater than the threshold value P1 at step S504, on the other hand, the tentative quote Ppr is subsequently compared with another threshold value P2 (step S508). The threshold value P2 is smaller than the threshold value P1 and is set as a value level criterion to measure the value level of the tentative quote Ppr. When the tentative quote Ppr exceeds the threshold value P2, the trade-in assessment flag F is set equal to a value '0', which represents no requirement of assessment for determination of the final trade-in price, and a function f(Ppr) of the tentative quote Ppr is set to the trade-in quote Pest (step S510). Here the function f(Ppr)=Ppr. In this case, the trade-in price is fixed to the tentative quote Ppr, that is, the minimum trade-in quote Pmin. The minimum trade-in quote Pmin is the firm trade-in price of the used personal computer without assessment. The minimum trade-in quote Pmin is calculated as the total of the values of the components included in the used personal computer. Namely the respective used personal computers have different values of the minimum trade-in quote Pmin.

When the tentative quote Ppr is not greater than the threshold value P2 at step S508, the trade-in assessment flag F is set equal to '0', which represents no requirement of assessment for determination of the final trade-in price, and a fixed price C is set to the trade-in quote Pest (step S512). Here the fixed price C is equal to the threshold value P2. In this case, the fixed price C is set to the trade-in price. Namely the fixed price C is the firm trade-in price of the used personal computer without assessment. This fixed price C does not depend upon the components of the used personal computer.

After completion of the settings of the trade-in assessment flag F and the trade-in quote Pest at any of the steps S506, S510, and S512, the Web server 12 creates a quotation window, based on the settings (step S514). The program then exits from this quotation window creation routine. FIG. 7 shows the mapping of the level of the tentative quote Ppr to the requirement of assessment and the trade-in quote Pest, as well as to a deduction D (discussed later).

Referring back to the process chart of FIG. 4, the Web server 12 sends the quotation window created at step S514 and cookie information, which includes the setting of the trade-in quote Pest and the quotation requirement information received from the user computer 40, to the user computer 40 (step S170). The user computer 40 opens the received quotation window on its display 42 and stores the received cookie information into a predetermined storage area in the user computer 40.

The quotation window opening on the display 42 is described below with reference to some concrete examples. When the tentative quote Ppr exceeds the threshold value P1, a value range between the minimum trade-in quote Pmin and the maximum trade-in quote Pmax is given as the trade-in quote as shown in FIG. 8(a). The quotation window includes a description regarding the definition of the trade-in quote (see Notandum 1 in FIG. 8(a)), a description showing that the final trade-in price will be determined based on the assessment of the used article (see Notandum 2 in FIG. 8(a)), a 'Trade-in Request' button selected to effectuate a trade-in, and a 'Cancel' button selected to throw up a trade-in. The quotation window of FIG. 8(a) also includes a description showing that any malfunctioning used article is not the subject of trade-in (see Notandum 3) and a description regarding transfer of the proprietary right (see Notandum 4).

When the tentative quote Ppr is not greater than the threshold value P1 but exceeds the threshold value P2, the function f(Ppr) (=the minimum trade-in quote Pmin), that is, a settled price of no value range, which is varied according to the tentative quote Ppr, is given as the trade-in quote as shown in FIG. 8(b). The quotation window of FIG. 8(b) includes the description regarding the definition of the trade-in quote (see Notandum 1) and a description showing that the final trade-in price is settled as the trade-in quote and that no assessment of the used article is carried out (see Notandum 2), as well as the 'Trade-in Request' button, the 'Cancel' button, and Notandum 3 and 4 (not shown), which are identical with those of FIG. 8(a).

When the tentative quote Ppr is not greater than the threshold value P2, a fixed price C (=the threshold value P2) of no value range that does not depend upon the tentative quote Ppr, is given as the trade-in quote as shown in FIG. 8(c). The quotation window of FIG. 8(c) includes the description regarding the definition of the trade-in quote (see Notandum 1) and a description showing that the final trade-in price is fixed as the trade-in quote and that no assessment of the used article is carried out (see Notandum 2), as well as the 'Trade-in Request' button, the 'Cancel' button, and Notandum 3 and 4 (not shown), which are identical with those of FIG. 8(a).

Referring back to the process chart of FIG. 4, the user reads the notandum to recognize the contents of the quotation window and clicks the 'Trade-in Request' button to effectuate a trade-in or the 'Cancel' button to throw up a trade-in. The user computer 40 sends a trade-in request signal or a cancellation request signal to the Web server 12 via the Internet 20 in response to the click of the 'Trade-in Request' button or the 'Cancel' button (step S180). The Web server 12 receives either the trade-in request signal or the cancellation request signal and sends a window corresponding to the received request signal to the user computer 40 (step S190). When the received signal represents the trade-in request, the Web server 12 sends a top page window of the shopping site where the user can purchase new commodities, to the user computer 40. When the received signal represents the cancellation request, on the other hand, the Web server 12 sends a top page window of the used article quotation site to the user computer 40.

Figure 9:
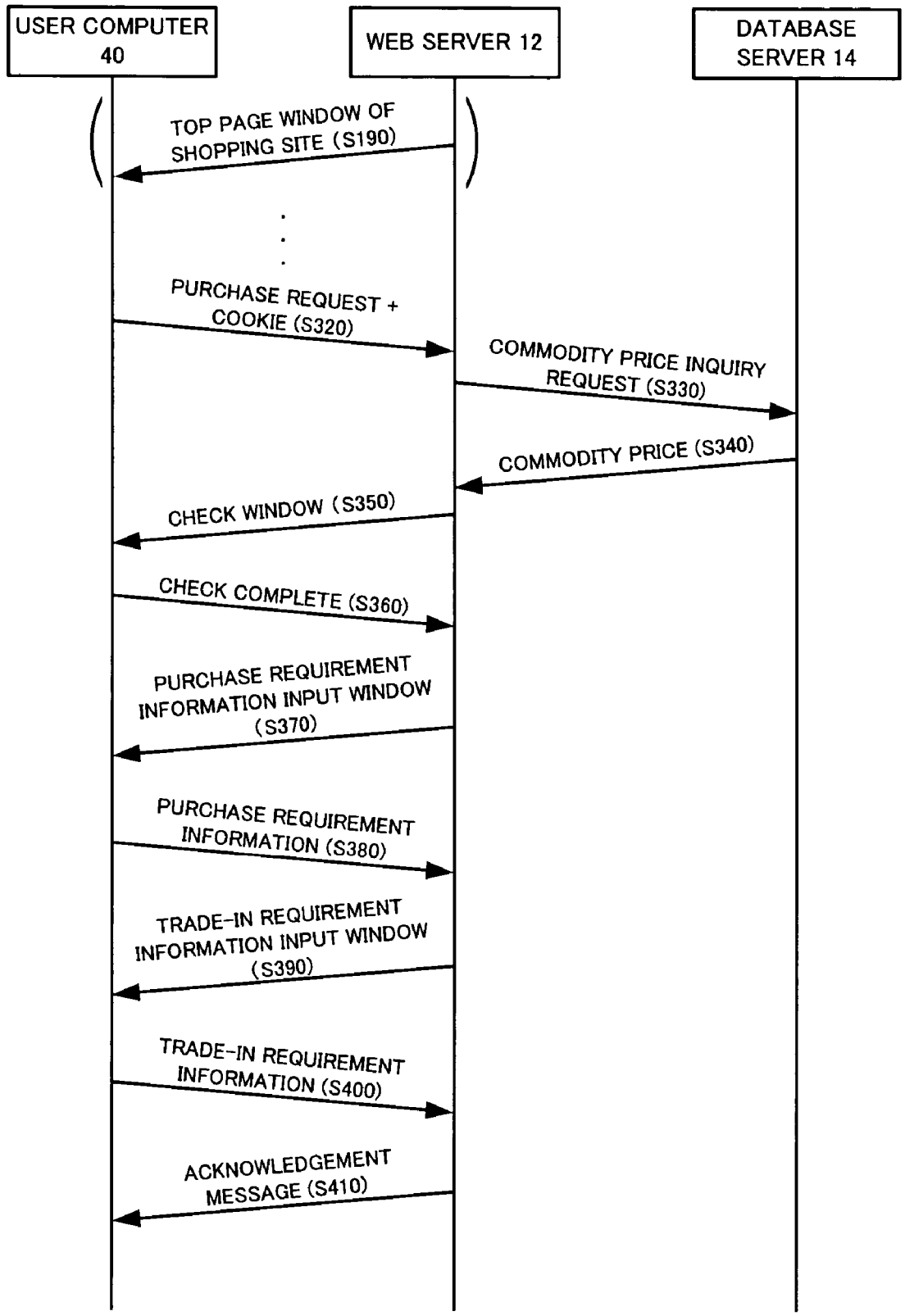

The server system 10 of this embodiment works as discussed below, when functioning to open the shopping site. FIG. 9 shows a time-series process of communication between the Web server 12, the database server 14, and the user computer 40. It is here assumed that the user refers to the result of the quotation with regard to the used personal computer at the used article quotation site as discussed above and clicks the 'Trade-in Request' button at step S180 and that the top page window of the shopping site is sent to the user computer 40 in response to the click of the 'Trade-in Request' button at step S190.

The user selects one or multiple desired commodities among a diversity of computer products provided on the top page window of the shopping site (not shown) and adds all of the selected commodities to a shopping cart. In this example, it is assumed that the user adds a brand-new personal computer as the desired commodity to the shopping cart. Transmission of requests and replies is repeated between the user computer 40 and the Web server 12 in this process, although the details of the communication are not discussed specifically. In response to the user's click of a Purchase button (not shown), the user computer 40 sends a purchase request of the commodity added to the shopping cart to the Web server 12 via the Internet 20 (step S320). Here the user computer 40 attaches the cookie information received from the Web server 12 at step S170 to the purchase request and sends the cookie information together with the purchase request to the Web server 12. The Web server 12 stores the received cookie information into the internal storage unit 13, and sends an inquiry request signal for the price of the selected commodity as the object of purchase to the database server 14 (step S330). The database server 14 receives the inquiry request signal for the price of the selected commodity, reads the commodity price mapped to the name of the selected commodity from the commodity price table (see FIG. 3) stored in the data storage device 16, and sends the read-out commodity price to the Web server 12 (step S340).

Figure 10:
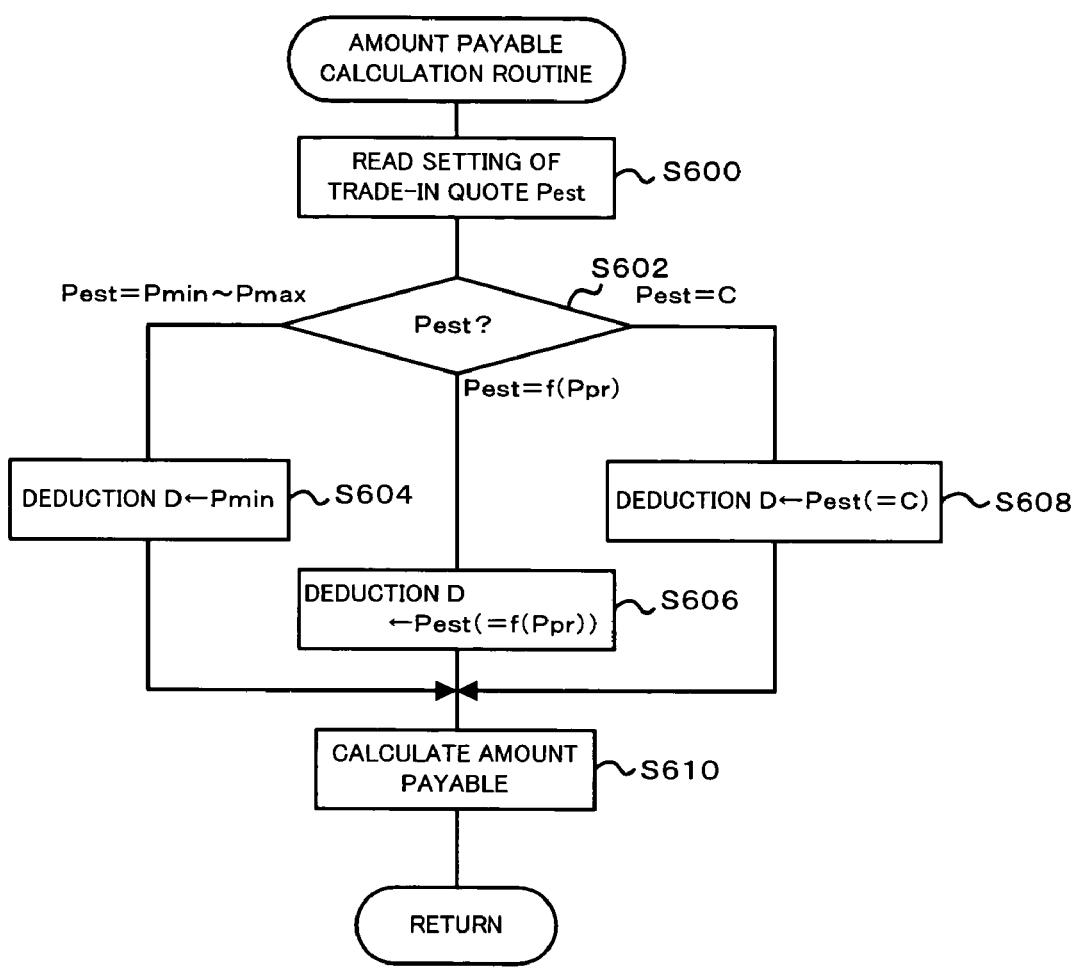

The Web server 12 receives the commodity price and executes an amount payable calculation routine shown in the flowchart of FIG. 10. The Web server 12 reads the setting of the trade-in quote Pest included in the cookie information stored in the internal storage unit 13 (step S600), and determines whether the setting of the trade-in quote Pest is the price having the value range of the minimum trade-in quote Pmin to the maximum trade-in quote Pmax, the settled price f(Ppr) of no value range, or the fixed price C of no value range (step S602). When the setting of the trade-in quote Pest is the price having the value range of the minimum value Pmin to the maximum value Pmax, the minimum trade-in quote Pmin is set to the deduction D (step S604). When the setting of the trade-in quote is the settled price f(Ppr) of no value range, which depends upon the tentative quote Ppr, the trade-in quote Pest (=f(Ppr)) is set to the deduction D (step S606). When the setting of the trade-in quote is the fixed price C, the trade-in quote Pest (=C) is set to the deduction D (step S608). After any of the processing at steps S604, S606, and S608, a difference obtained by subtracting the deduction D from the commodity price is calculated as an amount payable (step S610). The program then exits from this amount payable calculation routine. Referring back to the process chart of FIG. 9, the Web server 12 sends a check window to the user computer 40 (step S350). The check window includes the name of the commodity as the object of purchase, the commodity price, the used personal computer as the subject of the trade-in, and its trade-in quote, and the calculated amount payable.

One example of the check window is shown in FIG. 11. In the illustrated example of the check window, the setting of the trade-in quote Pest is the price having the value range of the minimum trade-in quote Pmin to the maximum trade-in quote Pmax. The final trade-in price is determined in the range of the minimum value Pmin to the maximum value Pmax after the system makes an assessment of the used personal computer. When the final trade-in price exceeds the minimum value Pmin, the calculated amount payable is disadvantageous to the user, due to underestimation of the deduction D. The difference between the final trade-in price and the minimum trade-in quote Pmin is thus paid back to the user for the advantage of the user. This is described in Notandum 2 on the check window. A trade-in subject box of the check window shows part or all of the quotation requirement information, for example, the processor name and the clock frequency with regard to the CPU and the capacities with regard to the memory and the HDD. When the setting of the trade-in quote Pest is the settled price f(Ppr) of no value range or the fixed price C of no value range, the final trade-in price is settled without an assessment. The deduction D is accordingly fixed. In such cases, Notandum 1 and 2 are omitted from the check window.

The user checks the contents of the check window and clicks an 'OK' button to effectuate a trade-in or a 'Cancel' button to throw up a trade-in. The user has already clicked the 'Trade-in Request' button at the used article quotation site and, in many cases, clicks the 'OK' button on the check window. In the description below, it is assumed that the user clicks the 'OK' button. In response to a click of the 'OK' button, the user computer 40 sends a check complete signal to the Web server 12 via the Internet 20 (step S360). The Web server 12 receives the check complete signal and sends back a purchase requirement information input window to the user computer 40 via the Internet 20 (step S370). The user computer 40 then opens the received purchase requirement information input window on the display 42. One example of the purchase requirement information input window is shown in FIG. 12. Here the purchase requirement information includes the postal address, the name, the telephone number, and the mail address of the user, a delivery address of commodities where one or multiple commodities purchased at the shopping site are to be delivered, the telephone number of the delivery address, the date and time of delivery, and the payment policy. In the case where the delivery address of commodities is identical with the postal address of the user, the user is not required to enter the delivery address of commodities or the telephone number of the delivery address but is only required to click a radio button 'Yes' in an input box 'Delivery Address of Commodities=User's Address?' on the purchase requirement information input window of FIG. 12. The user clicks a 'Send' button after entry of the required information on this purchase requirement information input window. The user computer 40 then sends the input purchase requirement information to the Web server 12 via the Internet 20 (step S380).

The Web server 12 receives the purchase requirement information and subsequently transmits a trade-in requirement information input window to the user computer 40 via the Internet 20 (step S390). The user computer 40 opens the received trade-in requirement information input window on the display 42. One example of the trade-in requirement information input window is shown in FIG. 13. Here the trade-in requirement information includes a pickup address of the used article, the telephone number of the pickup address, the date and time of pickup, and a remittance address of the trade-in money. In the case where the pickup address of the used article is identical with either the delivery address of commodities or the postal address of the user, the user is not required to enter the pickup address of the used article or the telephone number of the pickup address but is only required to click a radio button 'Yes' in an input box 'Pickup Address of Used Article=User's Address?' or a radio button 'Yes' in an input box 'Pickup Address of Used Article=Delivery Address of Commodities?' on the trade-in requirement information input window of FIG. 13. The user clicks a 'Send' button after entry of the required information on this trade-in requirement information input window. The user computer 40 then sends the input trade-in requirement information to the Web server 12 via the Internet 20 (step S400). The Web server 12 receives the trade-in requirement information and sends back an acknowledgement message to the user computer 40 (step S410). This terminates the series of processing at the shopping site.

The server system 10 receives the payment from the user and delivers the selected commodities to the specified delivery address. The server system 10 also picks up the used personal computer as the subject of the trade-in, makes an assessment of the used personal computer when assessment is required, and settles the final trade-in price in the range of the minimum trade-in quote Pmin to the maximum trade-in quote Pmax according to the result of the assessment. In the case where the final trade-in price exceeds the preset deduction D, the difference between the final trade-in price and the deduction D is paid back to the user. When no assessment is required, on the other hand, the series of operations terminate at the pickup of the used personal computer.

The respective constituents of the embodiment are mapped to the elements of the present invention. The Web server 12 and the database server 14 of this embodiment correspond to the commodity price specification module and the quote determination module of the invention. The Web server 12 also corresponds to the deduction setting module, the difference calculation module, and the amount payable notification module of the invention.

As discussed above, in response to receipt of a purchase request of one or multiple commodities from the user computer 40, the server system 10 of this embodiment specifies the price of each selected commodity (commodity price). In response to receipt of a trade-in request of a used personal computer and quotation requirement information required for quotation of the used personal computer from the user computer 40, the server system 10 determines the trade-in quote Pest of the used personal computer based on the quotation requirement information, sets a deduction D of the commodity price according to the predetermined trade-in quote Pest, calculates the difference by subtracting the deduction D from the commodity price, and informs the user computer 40 of the calculated difference as the amount payable. The structure of the embodiment automatically subtracts the preset deduction D from the commodity price and informs the user of the difference as the amount payable. This arrangement desirably simplifies the procedure, compared with the prior art structure that requires the user to go through both the procedure of paying the purchase price of each selected commodity and the procedure of receiving the trade-in money of the used article. Namely the arrangement of the embodiment ensures the user friendly sales of commodities and trade-in of used articles.

The deduction D is not less than the fixed price C. Namely the fixed price C represents a support price. The user can thus advantageously receive at least the fixed price C as the trade-in value of the used personal computer.

When the tentative quote Ppr of the used personal computer exceeds the threshold value P1, the server system 10 of the embodiment determines requirement of an assessment to settle the final trade-in price of the used personal computer. The server system 10 thus sets the price having the predetermined value range (that is, the value range of the minimum trade-in quote Pmin to the maximum trade-in quote Pmax) to the trade-in quote Pest, and determines the final trade-in price in this range according to the result of the assessment. In this case, the server system 10 sets the minimum trade-in quote Pmin to the deduction D and automatically allows a reduction of the commodity price. The amount payable is accordingly reduced. When the final trade-in price of the used personal computer determined according to the result of the assessment exceeds the minimum trade-in quote, the difference is paid back to the user. This arrangement desirably heightens the user's satisfaction level.

When the tentative quote Ppr of the used personal computer is not greater than the threshold value P1, on the other hand, the server system 10 of the embodiment determines no requirement of an assessment to settle the final trade-in price of the used personal computer. The server system 10 thus sets the price of no value range (the settled price f(Ppr) or the fixed price C) to the trade-in quote Pest, and settles the setting of the trade-in quote Pest as the final trade-in price. The deduction D is reasonably determined according to the setting of the price having no value range. In the case of a relatively high value of the tentative quote Ppr, that is, a relatively high valuation of the used personal computer, the settled price f(Ppr) of no value range depending upon the tentative quote Ppr is set to the trade-in quote Pest. In the case of a relatively low value of the tentative quote Ppr, that is, a relatively low valuation of the used personal computer, the fixed price C of no value range is set to the trade-in quote Pest. This arrangement desirably heightens the user's satisfaction level, compared with the prior art technique that uniformly sets the fixed price C to the trade-in quote Pest under the condition of no requirement of an assessment to settle the final trade-in price.

The first embodiment discussed above is only illustrative and not restrictive in any sense. There may be many modifications, changes, and alterations of the first embodiment.

For example, in the structure of the embodiment discussed above, when the user computer 40 gives a trade-in quotation request with regard to multiple used articles, the Web server 12 may set the minimum trade-in quote Pmin of each used article computed by the database server 14 to the tentative quote Ppr and may specify the sum of deductions D read from the table of FIG. 7 as a total deduction from the commodity price. This means that the total deduction is determined according to the sum of the trade-in quotes Pest obtained from the table of FIG. 7. This arrangement enables multiple used articles to be taken as a trade-in for purchase of commodities, and gives a greater price reduction to the user, compared with a trade-in of only one used article.

In the structure of the above embodiment, the Web server 12 may adjust the amount payable in the check window of FIG. 11, that is, the difference obtained by subtracting the setting of the deduction D from the commodity price, to be not lower than a preset value. When the amount payable is below the preset value, one possible application may send a message, which tells that the used personal computer is not taken as a trade-in because of the insufficient purchase price of the commodity or because of the excess trade-in discount, to the user computer 40. In response to a trade-in request with regard to multiple used articles, another possible application may limit the number of used articles for a trade-in, so as to make the amount payable not lower than the preset value. The used articles, which are not the subject of the trade-in, may be cashed out. Here the cash-out represents acceptance of a used article without purchase of any commodity, and the cash-out price is generally set lower than the trade-in price.

Figure 14:
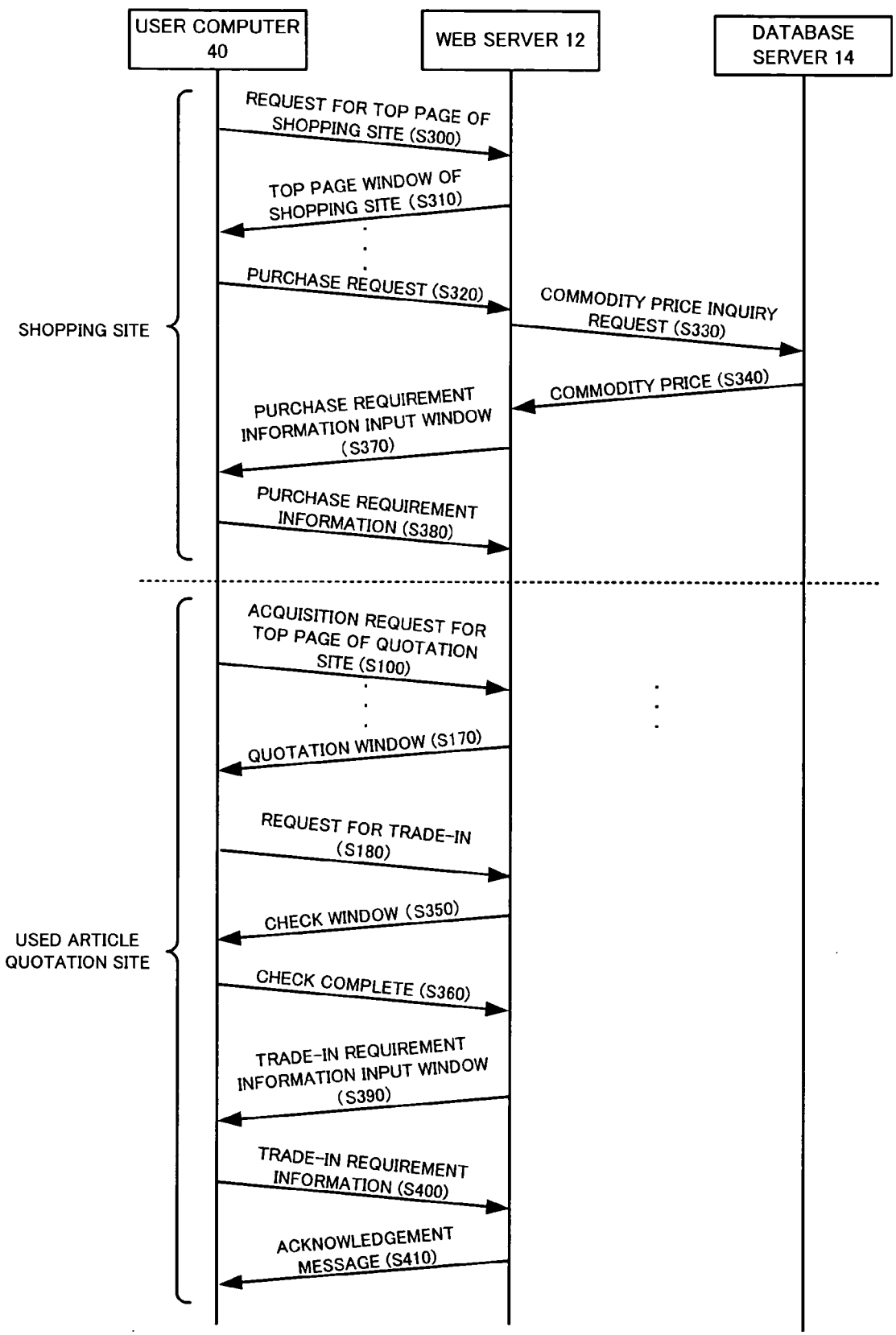

In the embodiment discussed above, the server system 10 receives the information regarding the trade-in quotation of a used article from the user computer 40 at the used article quotation site and subsequently receives the information regarding the purchase procedure of commodities from the user computer 40 at the shopping site. On the contrary, the server system 10 may first receive the information regarding the purchase procedure of commodities from the user computer 40 at the shopping site and then require the user computer 40 to enter the information regarding the trade-in quotation of a used article at the used article quotation site. The series of operations in the latter case is shown in the process chart of FIG. 14. In the time-series process of FIG. 14, when the user enters the URL of a shopping site on the Web browser, the user computer 40 sends an acquisition request for a top page of the shopping site to the Web server 12 via the Internet 20 (step S300). The Web server 12 receives the acquisition request and sends a top page window of the shopping site to the user computer 40 via the Internet 20 (step S310). The user computer 40 opens the received top page window of the shopping site on the display 42. When the user adds one or multiple desired commodities for purchase to a shopping cart and clicks a purchase button (not shown), the user computer 40 sends a purchase request (without cookie) of the commodities added to the shopping cart to the Web server 12 via the Internet 20 (step S320). The Web server 12 receives the purchase request and sends an inquiry request signal for the price of each selected commodity to the database server 14 (step S330). When receiving the price of each selected commodity from the database server 14 (step S340), the Web server 12 sends the purchase requirement information input window (see FIG. 12) to the user computer 40 via the Internet 20 (step S370). The Web server 12 then receives the purchase requirement information from the user computer 40. After this series of processing at the shopping site, the Web server 12 executes a series of processing at the used article quotation site. The processing of steps S100 through S180 in this modified arrangement is similar to the processing of the above embodiment shown in the process chart of FIG. 4 and is thus not specifically described here. The only differences are that no cookie information is attached to the quotation window at step S170 and that the Web server 12 receives a trade-in request at step S180. The Web server 12 then executes the amount payable calculation routine shown in the flowchart of FIG. 10 to determine the amount payable, creates the check window shown in FIG. 11, and sends the check window to the user computer 40 (step S350). The Web server 12 receives a check complete signal from the user computer 40 (step S360), and sends the trade-in requirement information input window (see FIG. 13) to the user computer 40 via the Internet 20 (step S390). The Web server 12 subsequently receives the trade-in requirement information from the user computer 40 (step S400), and sends back the acknowledgement message to the user computer 40 (step S410). The details of the respective steps have been discussed in the above embodiment and are thus not described here. The procedure of FIG. 14 ensures the similar effects to those of the embodiment discussed above.

In the server system 10 of the embodiment, the Web server 12 sends the cookie information, which includes the minimum trade-in quote Pmin, the maximum trade-in quote Pmax, and the quotation requirement information received from the user computer 40, to the user computer 40. This procedure may be modified as discussed below. According to the modified procedure, the Web server 12 allocates a quotation ID to the trade-in quote and the quotation requirement information, creates a quotation window including the quotation ID, the trade-in quote, and the quotation requirement information, and stores the created quotation window with the quotation ID into the internal storage unit 13 of the Web server 12. A window opening in response to the purchase request at the shopping site has a quotation ID input box. When the user has obtained the trade-in quote at the used article quotation site before moving into the shopping site, the user enters the given quotation ID in the quotation ID input box and then gives a purchase request for commodities. The user computer 40 sends the purchase request and the quotation ID to the Web server 12 via the Internet 20. The Web server 12 retrieves the internal storage unit 13, reads the trade-in quote and the quotation requirement information corresponding to the received quotation ID, and creates the check window (see FIG. 11). This arrangement also ensures the similar functions and effects to those of the embodiment discussed above. The trade-in quote and the quotation requirement information are stored in the internal storage unit 13 of the Web server 12. This facilitates the information management by the Web server 12.

The procedure of the embodiment reads the values of the components included in each used personal computer from the component price table and specifies the total of the values of the components as the minimum trade-in quote Pmin. One modification may specify the total value of the components as the maximum trade-in quote Pmax and determine the minimum trade-in quote Pmin based on the maximum trade-in quote Pmax. Another modification may prepare a component price table including both a minimum trade-in price and a maximum trade-in price corresponding to each component and compute both the total of the maximum prices of the components as the maximum trade-in quote Pmax and the total of the minimum prices of the components as the minimum trade-in quote Pmin. Any appropriate value other than the minimum trade-in quote Pmin (for example, the maximum trade-in quote Pmax) may be set to the tentative quote Ppr, instead of the minimum trade-in quote Pmin.

The above embodiment regards the used personal computers. The technique of the invention is also applicable to a diversity of other used articles, for example, used peripheral equipment of personal computers like displays, printers, and scanners, used office automation equipment like photocopiers, facsimiles, and paper shredders, used home electric appliances like television sets, refrigerators, washing machines, and microwave ovens, used vehicles like automobiles, motorbikes, bicycles, and boats, used sports equipment including golf clubs, tennis rackets, skies, and snowboards, and existing homes like apartments and houses.

In the structure of the embodiment discussed above, the server system 10 includes two servers, the Web server 12 and the database server 14. The server system may have only one server, where the Web server 12 has the functions of both the database server 14 and the Web server 12. The server system may otherwise include three or more servers. The server system opening the used article quotation site may be separate from the server system opening the shopping site. These two server systems may be constructed as the server system of the invention.

Second Embodiment

Figure 15:
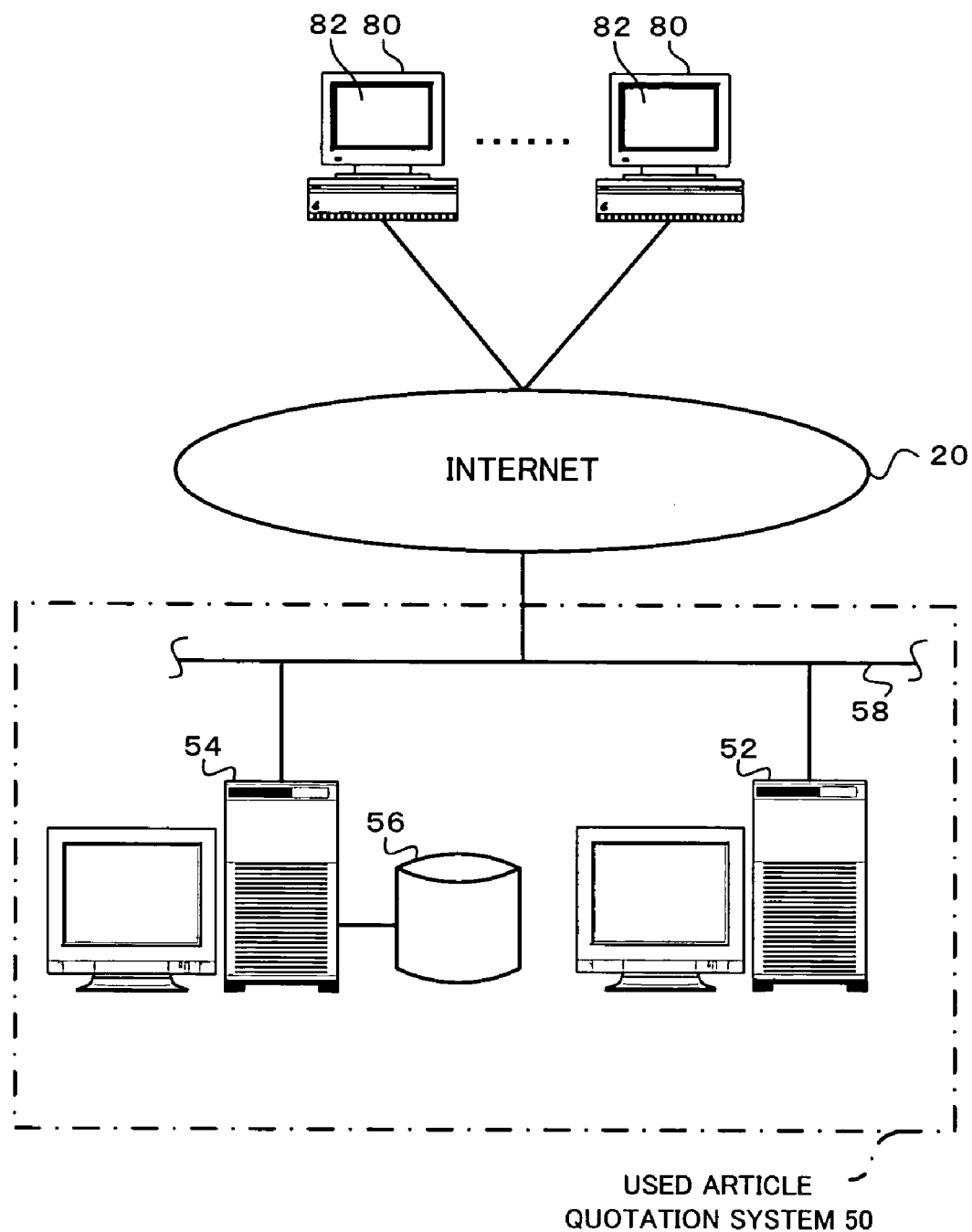

A second embodiment of the invention is discussed below with reference to the accompanied drawings. FIG. 15 schematically illustrates the construction of a used article quotation system 50 in one embodiment of the invention, and FIG. 16 shows a database stored in a data storage device 56 connecting with a database server 54 in the used article quotation system 50 of FIG. 15.

The used article quotation system 50 of this embodiment includes a Web server 52 and a database server 54, which are mutually connected in a communicable manner via a network cable 58.

The Web server 52 opens a used article quotation site, which shows quotes of each used personal computer owned by each user. The Web server 52 works as a contact for requests from user computers 80 connecting with the Internet 20. The Web server 52 functions to receive a request from each of the user computers 80, make a reply to the request, and transmit the reply to the user computer 80. The Web server 52 also functions to receive quotation requirement information from each of the user computers 80, transfer the quotation requirement information to the database server 54, activate the database server 54 to compute a cash-out quote, receive a result of the computation, make a reply based on the received computation result, and transfer the reply to the user computer 80. The quotation requirement information represents information on classes and performances of components constituting used personal computers, as discussed in detail later.

A data storage device 56 is connected to the database server 54 and stores a component price table, in which component names and respective classes of components included in used personal computers are mapped to values, as shown in FIG. 16. The components of the personal computers are grouped by the component names, such as CPUs, memories, HDDs, FDDs CD-ROMs, LAN cards, and operating systems (OS). The CPUs are further classified into classes by the name of the processor and the clock frequency, and the values are set for the respective classes. The memories and the HDDs are classified into classes by their capacities, and the values are set for the respective classes. Although not being specifically illustrated, the CD-ROMs are classified into classes by the function (for example, a DVD readable function or a DVD writable function), and the values are set for the respective classes. The values of the FDDs and the LAN cards do not depend upon their classes but are set according to their presence or absence. The values of the operating systems (OS) as the software are set for the respective versions (for example, Windows 95, 98, Me, XP).

The database server 54 is connected with the data storage device 56. The database server 54 functions to retrieve the data storage device 56, based on the quotation requirement information regarding each used personal computer, which has been received from each of the user computers 80 via the Web server 52, compute a total value of respective used components as a maximum cash-out quote PAmax, and transfer the computed maximum cash-out quote PAmax to the Web server 52.

The user computer 80 is a known general-purpose personal computer used by either an individual or a legal entity. The user computer 80 utilizes a Web browser installed therein to gain access to the used article quotation site opened by the Web server 52 via the Internet 20. The user computer 80 makes various pieces of information shown on its display 82.

Figure 17:
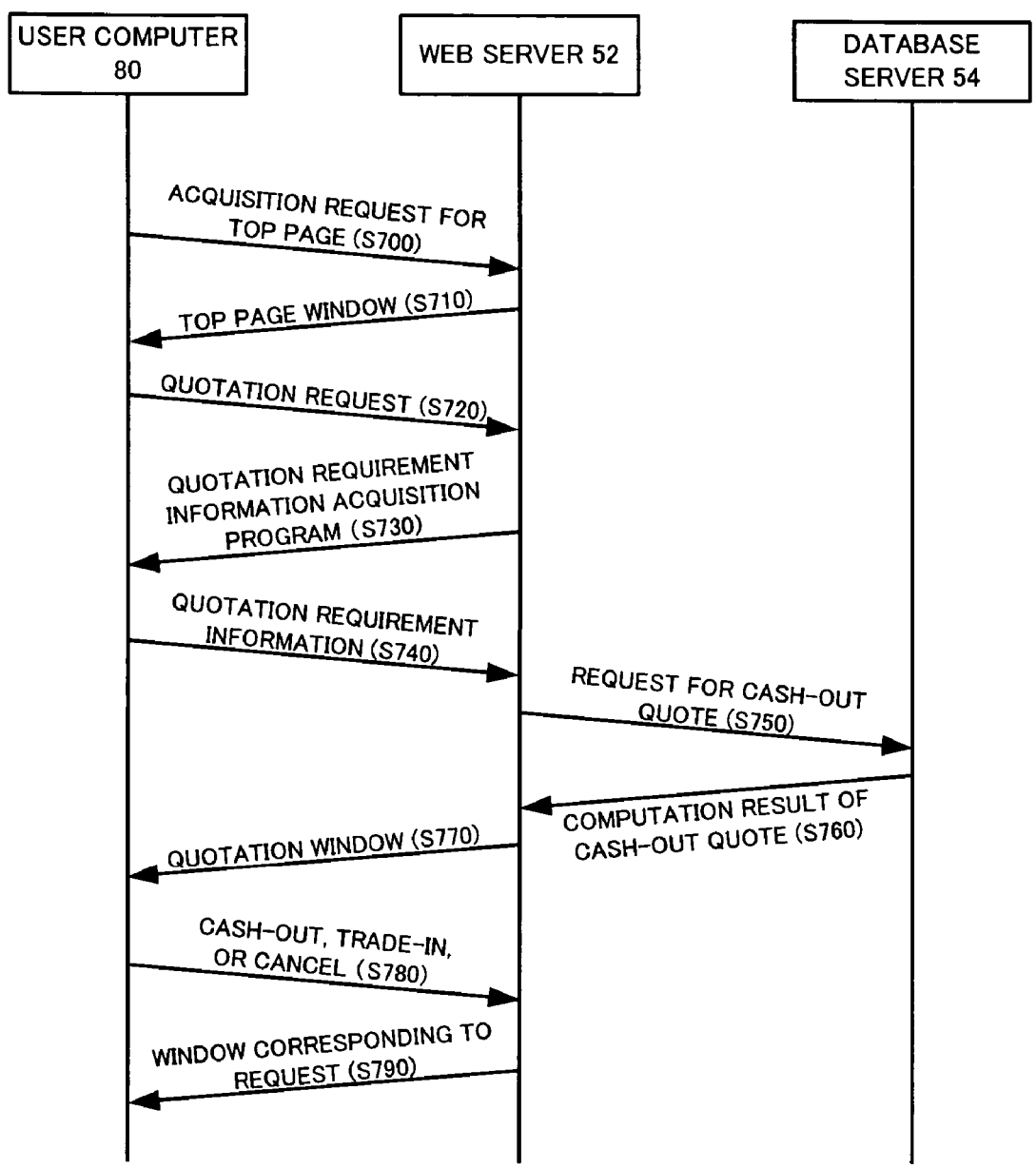

The used article quotation system 50 of this embodiment is operated in the manner discussed below. FIG. 17 shows a time series process of communication between the Web server 52, the database server 54, and the user computer 80.

The user activates the Web browser on the user computer 80 and inputs a URL (Uniform Resource Locator) of the used article quotation site opened by the Web server 52. The user computer 80 then sends an acquisition request for a top page of the used article quotation site to the Web server 52 via the Internet 20 (step S700). The Web server 52 receives the acquisition request and transmits a top page window (not shown) of the used article quotation site to the user computer 80 via the Internet 20 (step S710). The user computer 80 opens the received top page window of the used article quotation site on the display 82.

The user clicks a quotation request button (not shown) provided on the top page window of the used article quotation site. The quotation request button is clicked to request a quotation for acceptance of the currently used user computer 80. In response to a click of the quotation request button, the user computer 80 sends a quotation request to the Web server 52 via the Internet 20 (step S720). The Web server 52 receives the quotation request and sends back a quotation requirement information acquisition program to the user computer 80 (step S730). The quotation requirement information acquisition program is a Web program executed by the user computer 80 and is created as a JAVA applet or Active X.

Figure 18:
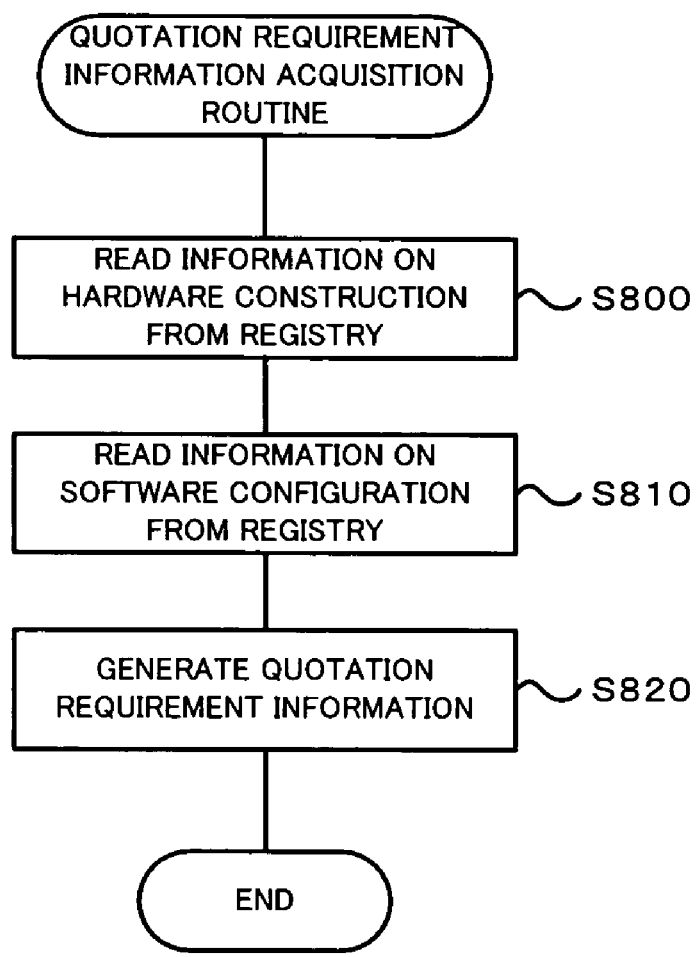

The user computer 80 executes the received quotation requirement information acquisition program as shown in the flowchart of FIG. 18. In this example, it is assumed that the OS used by the user computer 80 is Windows 98. When the quotation requirement information acquisition program starts, the user computer 80 first reads information regarding the hardware construction incorporated in the user computer 80 from a registry (step S800). A registry key 'HKEY_LOCAL_MACHINE' has been given to the registry, and there is a memory area in its lower hierarchy for storing the information regarding the hardware construction. The user computer 80 thus reads the specifications of the own components, for example, the processor name and the clock frequency of the CPU, the capacity of the memory, and the capacity of the HDD, from this memory area. The user computer 80 subsequently reads information regarding the software configuration incorporated in the user computer 80 from the registry (step S810). As mentioned above, the registry key HKEY_LOCAL_MACHINE' has been given to the registry, and there is a memory area in its lower hierarchy for storing the information regarding the software configuration. The user computer 80 thus reads the specifications of the own software, for example, the version of the OS, from this memory area. The user computer 80 then generates quotation requirement information, based on the read-out information regarding the hardware construction and the software configuration (step S820). This terminates the quotation requirement information acquisition program. One example of the quotation requirement information thus generated is shown in FIG. 19.

Referring back to the process chart of FIG. 17, the user computer 80 sends the quotation requirement information as shown in FIG. 19 to the Web server 52 via the Internet 20 (step S740). The Web server 52 receives the quotation requirement information and transmits the received quotation requirement information and a request signal for a cash-out quote to the database server 54 (step S750). The database server 54 receives the request signal for a cash-out quote and the quotation requirement information, refers to the component price table (see FIG. 16) stored in the data storage device 56 based on the quotation requirement information, and computes a maximum cash-out quote PAmax. The concrete procedure of computation reads the value mapped to the processor name and the clock frequency of the CPU, the value mapped to the capacity of the memory, the value mapped to the capacity of the HDD, and the other additional values from the component price table shown in FIG. 16 and calculates the total of these values of the components according to Equation 3 given below as the maximum cash-out quote PAmax:

$$PA\text{max} = \Sigma(\text{Values of Components}) \qquad \text{[Equation 3]}$$

Figure 20:
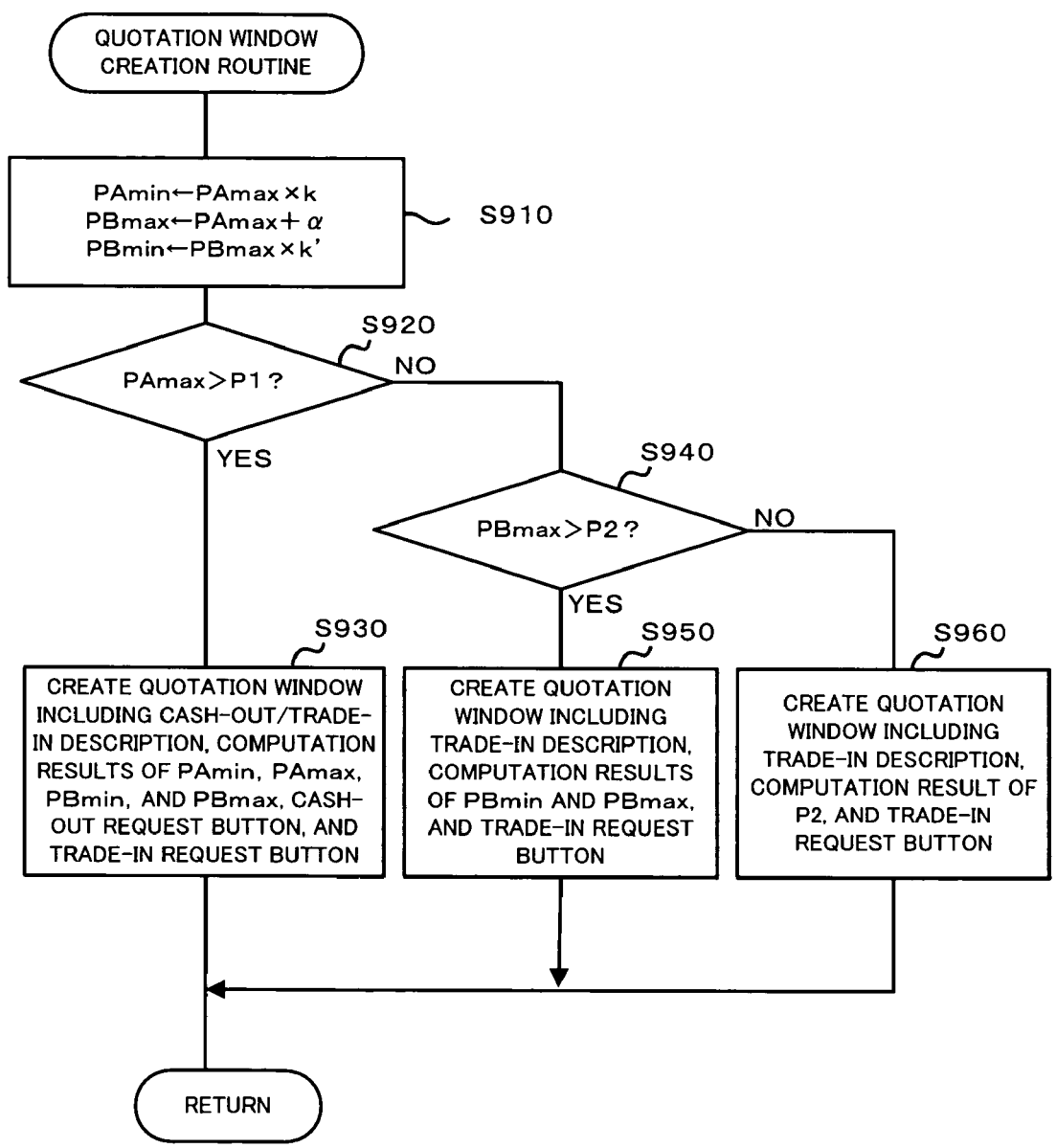

After computation of the maximum cash-out quote PAmax, the database server 54 transmits the computed maximum cash-out quote PAmax to the Web server 52 (step S760). The Web server 52 receives the transmitted maximum cash-out quote PAmax and executes a quotation window creation routine shown in the flowchart of FIG. 20. When the quotation window creation routine starts, the Web server 52 first calculates a minimum cash-out quote PAmin, a maximum trade-in quote PBmax, and a minimum trade-in quote PBmin from the maximum cash-out quote PAmax received from the database server 54 (step S910). One example of equations for calculating the respective values are given as Equations 4 below:

$$PA\text{min} = PA\text{max} \times k$$

$$PB\text{max} = PA\text{max} + \alpha$$

$$PB\text{min} = PB\text{max} \times k' \qquad \text{[Equations 4]}$$

(where k<1, k'<1, and a α>0)

The maximum cash-out quote PAmax is compared with a threshold value P1 (step S920). The threshold value P1 is set to a specified value of criterion for determining that the user computer 80 alone is not worth being redeemed by the used article quotation system 50, when the maximum cash-out quote PAmax is not greater than the threshold value P1. When the maximum cash-out quote PAmax exceeds the threshold value P1 at step S920, it is determined that the user computer 80 is worth both a cash-out without purchase of any commodity and a trade-in with purchase of one or multiple commodities. The Web server 52 accordingly creates a quotation window including cash-out and trade-in description, the minimum cash-out quote PAmin, the maximum cash-out quote PAmax, the minimum trade-in quote PBmin, the maximum trade-in quote PBmax, a Cash-out Request button, a Trade-in Request button, and a Cancel button (step S930). The program then exits from this quotation window creation routine. One example of the quotation window created in this case is shown in FIG. 21. The cash-out and trade-in description shows that the cash-out quote represents a quote without purchase of any commodity, that the trade-in quote represents a quote with purchase of one or multiple commodities, that any malfunctioning used article is not the subject of cash-out or trade-in, that the final cash-out price and the final trade-in price will be determined in the respective ranges of minimum values and maximum values after the system makes an assessment of the used article, and that the proprietary right to the used article is automatically transferred to the system at the time when the used article is delivered to the system (see 'Notandum' in the quotation window of FIG. 21).

Figure 22:
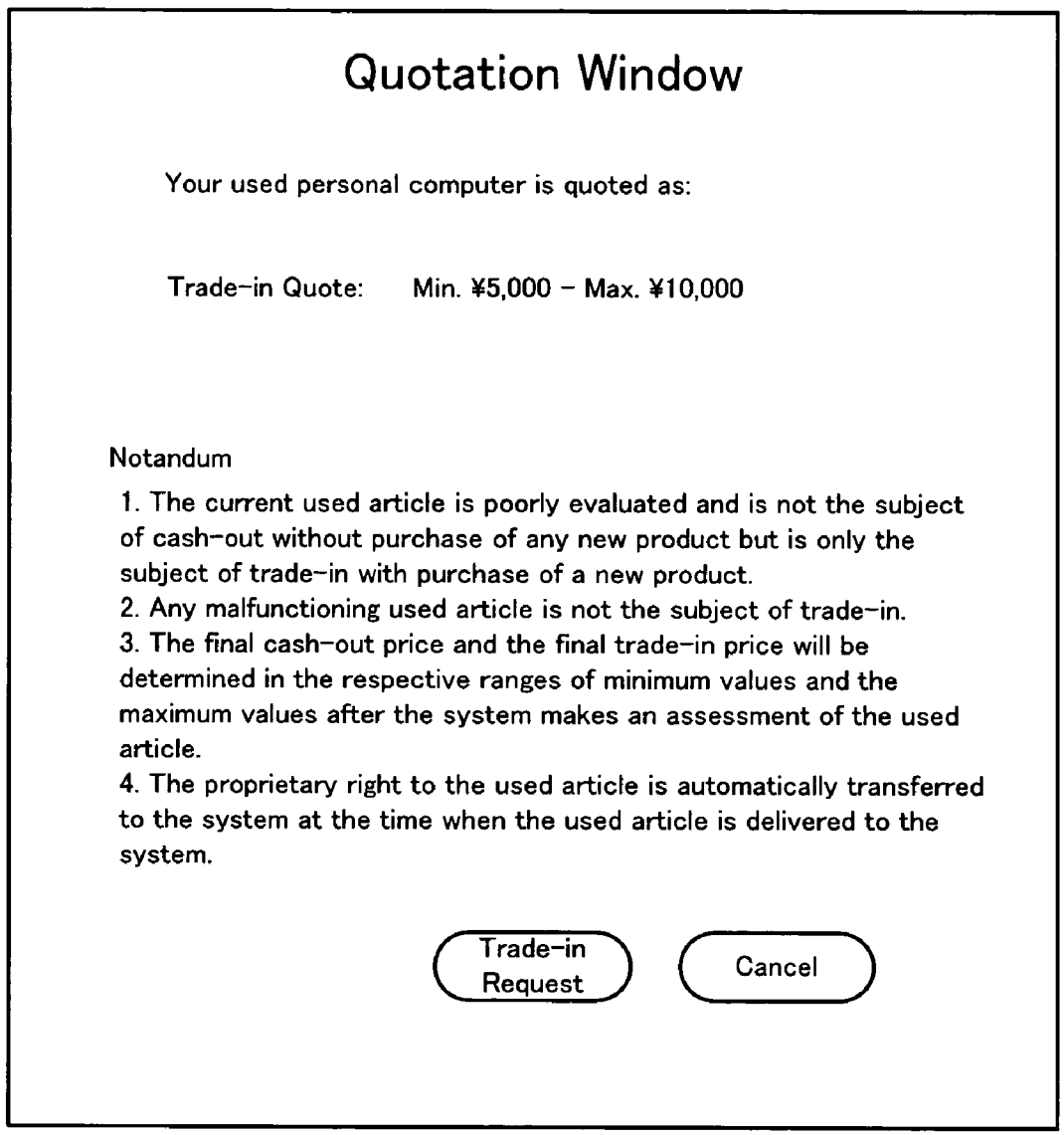

When the maximum cash-out quote PAmax is not greater than the threshold value P1 at step S920, on the other hand, it is determined that the user computer 80 is not worth a cash-out without purchase of any commodity but is worth a trade-in with purchase of one or multiple commodities. The maximum trade-in quote PBmax is then compared with a threshold value P2 (step S940). The threshold value P2 is set to a specified value of criterion for determining that the user computer 80 is not worth being set to have a certain range of the trade-in quote by the used article quotation system 50, when the maximum trade-in quote PBmax is not greater than the threshold value P2. When the maximum trade-in quote PBmax exceeds the threshold value P2 at step S940, it is determined that the user computer 80 is worth being set to have a certain range of the trade-in quote with purchase of one or multiple commodities. The Web server 52 accordingly creates a quotation window including trade-in description, the minimum trade-in quote PBmin, the maximum trade-in quote PBmax, the Trade-in Request button, and the Cancel button (step S950). The program then exits from this quotation window creation routine. One example of the quotation window created in this case is shown in FIG. 22. The trade-in description shows that the current used article is poorly evaluated and is not the subject of cash-out without purchase of any commodity but is only the subject of trade-in with purchase of one or multiple commodities, that any malfunctioning used article is not the subject of trade-in, that the final trade-in price will be determined in the range of a minimum value and a maximum value after the system makes an assessment of the used article, and that the proprietary right to the used article is automatically transferred to the system at the time when the used article is delivered to the system (see 'Notandum' in the quotation window of FIG. 22).

When the maximum trade-in quote PBmax is not greater than the threshold value P2 at step S940, on the other hand, it is determined that the user computer 80 is not worth being set to have a certain range of the trade-in quote by the used article quotation system 50. The Web server 52 accordingly sets a fixed price P2 (this is identical with the threshold value P2 at step S940) to the trade-in quote and creates a quotation window including trade-in description, the fixed trade-in quote P2, the Trade-in Request button, and the Cancel button (step S960). The program then exits from this quotation window creation routine. One example of the quotation window created in this case is shown in FIG. 23. The trade-in description shows that the current used article is poorly evaluated and is not the subject of cash-out without purchase of any commodity but is only the subject of trade-in with purchase of one or multiple commodities, that any malfunctioning used article is not the subject of trade-in, and that the proprietary right to the used article is automatically transferred to the system at the time when the used article is delivered to the system (see 'Notandum' in the quotation window of FIG. 23). In this case, the used article is not assessed but is taken as a trade-in with the fixed trade-in quote P2. After conclusion of the quotation window creation routine, the program goes back to the process chart of FIG. 17. The Web server 52 sends the quotation window thus created to the user computer 80 (step S770). The user computer 80 opens the received quotation window on the display 82.

For example, the quotation window shown in FIG. 21 is opened on the display 82 of the user computer 80. The user compares the cash-out quote with the trade-in quote on the quotation window and especially makes comparison between the minimum cash-out and trade-in quotes and between the maximum cash-out and trade-in quotes. The user clicks the 'Cash-out Request' button to effectuate a cash-out, the 'Trade-in Request' button to effectuate a trade-in, or the 'Cancel' button to throw up both a cash-out and a trade-in. The user computer 80 respectively sends a cash-out request signal, a trade-in request signal, or a cancellation request signal to the Web server 52 via the Internet 20 in response to the click of the 'Cash-out Request' button, the 'Trade-in Request' button, or the 'Cancel' button (step S780). The Web server 52 receives one of the cash-out request signal, the trade-in request signal, and the cancellation request signal, analyzes the received request signal, and sends a window corresponding to the analyzed request signal to the user computer 80 (step S790). When the received signal represents the cash-out request, the Web server 52 sends a cash-out requirement information input window (not shown) to receive the user's entry of cash-out requirement information for cash-out of the user computer 80, to the user computer 80. When the received signal represents the trade-in request, the Web server 52 connects the user computer 80 to a shopping site (not shown) where the user can purchase one or multiple commodities. When the received signal represents the cancellation request, the Web server 52 sends the top page window (not shown) of the used article quotation site to the user computer 80.

In another example, the quotation window shown in FIG. 22 or shown in FIG. 23 is opened on the display 82 of the user computer 80. The user reads the notandum to acknowledge that the currently used user computer 80 is poorly evaluated and is not the subject of cash-out but is only the subject of trade-in, and clicks the 'Trade-in Request' button to effectuate a trade-in or the 'Cancel' button to throw up a trade-in. The user computer 80 respectively sends the trade-in request signal or the cancellation request signal to the Web server 52 via the Internet 20 in response to the click of the 'Trade-in Request' button or the 'Cancel' button (step S780). The Web server 52 receives either the trade-in request signal or the cancellation request signal, analyzes the received request signal, and sends a window corresponding to the analyzed request signal to the user computer 80 (step S790). When the received signal represents the trade-in request, the Web server 52 connects the user computer 80 to the shopping site where the user can purchase one or multiple commodities. When the received signal represents the cancellation request, the Web server 52 sends the top page window of the used article quotation site to the user computer 80.

The respective constituents of this embodiment are mapped to the elements of the present invention. The Web server 52 and the database server 54 of the embodiment correspond to the quote determination module of the invention. The Web server 52 corresponds to the quotation requirement information acquisition module and the quotation information transmission module, and the database server 54 corresponds to the component price storage module.

As described above, in response to receipt of a request for quotation of the user computer 80 itself, which has been sent from the user computer 80, the used article quotation system 50 of the second embodiment causes the user computer 80 to automatically read the quotation requirement information with regard to the user computer 80, acquires the quotation requirement information from the user computer 80, determines a quote of the user computer 80 based on the acquired quotation requirement information, and sends a quotation window including the quote to the user computer 80. Namely the used article quotation system 50 of the second embodiment determines the quote of the user computer 80, based on the quotation requirement information automatically read by the user computer 80. This arrangement enables even the user with little knowledge of the quotation requirement information, that is, the user with little computer-related knowledge, to be readily informed of the quote of the user computer 80.

The used article quotation system 50 of the second embodiment acquires the information regarding the respective components of the user computer 80 as the quotation requirement information, and determines the quote of the user computer 80 based on the acquired quotation requirement information.

While the whole set of the user computer 80 is not worth of acceptance, some of the components may be worth of acceptance. In such cases, the user can advantageously gain some level of the quote. The quote of the user computer 80 is determined according to the total value of the respective components. This ensures adequate quotation of the user computer 80.

The user computer 80 executes the quotation requirement information acquisition program transmitted from the used article quotation system 50 to generate the quotation requirement information. This arrangement desirably relieves the user's load of manipulating the user computer 80. The user computer 80 utilizes the registry for recording the information on the respective components of the user computer 80 to generate the quotation requirement information. The user computer 80 can thus readily read the information on the respective components of the user computer 80.

Both the trade-in quote and the cash-out quote are given to the user as the quotes of the user computer 80. This arrangement allows for a comparison between the trade-in quote and the cash-out quote and gives the user an indication for selecting either a trade-in or a cash-out of the user computer 80.

The second embodiment discussed above is only illustrative and not restrictive in any sense. There may be many modifications, changes, and alterations of the second embodiment.

In the structure of the second embodiment, the user computer 80 utilizes the registry for recording the information on the respective components of the user computer 80 to generate the quotation requirement information. The user computer 80 may alternatively utilize a BIOS for recording the information on the respective components of the user computer 80 to generate the quotation requirement information. The user computer 80 may otherwise read component information directly from the respective hardware components to generate the quotation requirement information.

The procedure of the second embodiment reads the values of the respective components of the user computer 80 from the component price table and computes the total of the values of the components as the maximum cash-out quote PAmax. One possible modification may compute the total value of the components as the minimum cash-out quote PAmin and determine the other quotes PAmax, PBmax, and PBmin, based on the minimum cash-out quote PAmin. Another possible modification may compute the total value of the components as the maximum trade-in quote PBmax and determine the other quotes PAmax, PAmin, and PBmin, based on the maximum trade-in quote PBmax. Still another possible modification may compute the total value of the components as the minimum trade-in quote PBmin and determine the other quotes PAmax, PAmin, and PBmax, based on the minimum trade-in quote PBmin. In order to make the value range between the minimum trade-in quote PBmin and the maximum trade-in quote PBmax higher than the value range between the minimum cash-out quote PAmin and the maximum cash-out quote PAmax, one modified technique may add or subtract an offset value (>0) to or from the total value of the components, multiply the total value of the components by a coefficient of greater than 1 or by a coefficient of smaller than 1, or use any suitable arithmetic expressions.

The procedure of the above embodiment sets the minimum cash-out quote PAmin, the maximum cash-out quote PAmax, the minimum trade-in quote PBmin, and the maximum trade-in quote PBmax. One possible modification may set fixed prices to the cash-out quote and the trade-in quote without any value range.

The procedure of the above embodiment computes the maximum cash-out quote PAmax by referring to the component price table and determines the maximum trade-in quote PBmax, based on the maximum cash-out quote PAmax. One modification may prepare a component price table including both a maximum cash-out price and a maximum trade-in price corresponding to each component and compute both the maximum cash-out quote PAmax and the maximum trade-in quote PBmax according to the component price table. Another modification may prepare a component price table including a minimum cash-out price and a minimum trade-in price corresponding to each component and compute both the minimum cash-out quote PAmin and the minimum trade-in quote PBmin according to the component price table.

In the structure of the embodiment discussed above, the used article quotation system 50 includes two servers, the Web server 52 and the database server 54. The used article quotation system may have only one server, where the Web server 52 has the functions of both the database server 54 and the Web server 52. The used article quotation system may otherwise include three or more servers.

What is claimed is:

1. A commodity sales system comprising:
   at least one server computer, the at least one server computer including:
   a memory system;
   a commodity price specification module that includes computer programs stored in the memory system for receiving a purchase request of a selected commodity from the user computer and for specifying a commodity price of the selected commodity;
   a storage module that stores a component price table including both a maximum trade-in price and a minimum trade-in price corresponding to each component included in a used personal computer;
   a maximum/minimum price determination module including:
   computer programs in the memory system for receiving a trade-in request of a used personal computer and component information regarding each of components included in the used personal computer from the user computer;
   computer programs in the memory system for outputting a maximum trade-in price and a minimum trade-in price corresponding to each of the components based on the received component information from the component price table; and
   computer programs in the memory system for determining a maximum price of the used personal computer as a sum of the maximum trade-in prices of the components and a minimum price of the used personal computer as a sum of the minimum trade-in prices of the components;
   a tentative quote setting module including computer programs in the memory system for setting the minimum price determined by the maximum/minimum price determination module to a tentative quote of the used personal computer;
   a deduction setting module including:
   computer programs in the memory system for requiring an assessment of the used personal computer when the tentative quote exceeds a first reference value, upon receipt of the used personal computer by the commodity sales system to determine a final trade-in price of the used personal computer; and
   computer programs in the memory system for setting the minimum price of the used personal computer to a deduction of the selected commodity, that is subtracted from a specified price of the commodity, a sub-module including:
computer programs in the memory system for determining an assessment of the used personal computer is not required when the tentative quote is not greater than the first reference value but exceeds a second reference value which is smaller than the first reference value; and computer programs in the memory system for setting the tentative quote of the used computer to the deduction of the commodity;

a sub-module including:
computer programs in the memory system for determining an assessment of the used personal computer is not required when the tentative quote is not greater than the second reference value; and computer programs in the memory system for setting a preset fixed price, which does not depend upon the tentative quote, to the deduction of the commodity; and an amount payable notification module including:
computer programs in the memory system for subtracting the setting of the deduction from the specified price of the selected commodity to calculate a difference;

computer programs in the memory system for notifying the user computer of the calculated difference as an amount payable; and computer programs in the memory system for notifying the user computer of the maximum price and the minimum price of the used personal computer when the tentative quote exceeds the first reference value, including notifying that, if the final trade-in price of the used personal computer determined after the assessment exceeds the minimum price, an amount of difference between the final trade-in price and the minimum price is to be refunded to the user.

2. A commodity sales system in accordance with claim 1, wherein said deduction setting module computer programs in the memory system for setting the deduction to be not less than a preset support price.

3. A commodity sales system in accordance with claim 1, wherein said deduction setting module includes computer programs in the memory system for setting a total deduction of the selected commodity, that is subtracted from the specified commodity price of the selected commodity, according to a sum of the trade-in quotes of the multiple used articles or a sum of deductions set for the respective used articles.

4. A commodity sales method that is carried out when a user purchases a selected commodity and trades in a used personal computer, said commodity sales method comprising the steps of:

(a) receiving a purchase request of a selected commodity by a server computer, the purchase request being received from the user computer and the purchase request specifying a commodity price of the selected commodity;

(b) receiving a trade-in request of a used personal computer and component information regarding each component included in the used personal computer by a server computer, the purchase request being received from the user computer, the trade-in request including:
a reference to a component price table, the component price table including:
both a maximum trade-in price and a minimum trade-in price corresponding to each component included in the used personal computer;

(c) output a maximum trade-in price and a minimum trade-in price corresponding to each of the components based on the received component information from the component price table;

(d) determining a maximum price of the used personal computer as a sum of the maximum trade-in prices of the components and a minimum price of the used personal computer as a sum of the minimum trade-in prices of the components;

(e) setting the minimum price determined in said step (d) to a tentative quote of the used personal computer;

(f) when the tentative quote exceeds a first reference value, requiring an assessment of the used personal computer is upon receipt of the used personal computer by the commodity sales system the assessment including:
determining a final trade-in price of the used personal computer; and
setting the minimum price of the used personal computer to a deduction of the selected commodity, that is subtracted from a specified price of the commodity;

(g) when the tentative quote is not greater than the first reference value but exceeds a second reference value which is smaller than the first reference value, determining that the assessment of the used personal computer is not required and setting the tentative quote of the used computer to the deduction of the commodity, and (h) when the tentative quote is not greater than the second reference value, determining that the assessment of the used personal computer is not required and setting a preset fixed price, which does not depend upon the tentative quote, to the deduction of the commodity; and (i) subtracting the setting of the deduction from the specified price of the selected commodity to calculate a difference;

(j) notifying the user computer of the calculated difference as an amount payable including:
when the tentative quote exceeds the first reference value, notifying the user computer of the calculated difference as an amount payable includes notifying the user computer of the maximum price and the minimum price of the used personal computer; and
notifying the user computer that, if the final trade-in price of the used personal computer determined after the assessment exceeds the minimum price, an amount of difference between the final trade-in price and the minimum price is to be refunded to the user.

5. A commodity sales method in accordance with claim 4, wherein setting the minimum price of the used personal computer to a deduction of the selected commodity includes setting the deduction to be not less than a preset support price.

6. A commodity sales method in accordance with claim 4, wherein said setting the minimum price of the used personal computer to a deduction of the selected commodity, that is subtracted from a specified price of the commodity includes setting a total deduction of the selected commodity, that is subtracted from the specified commodity price of the selected commodity, according to a sum of the trade-in quotes of the multiple used articles or a sum of deductions set for the respective used articles.

* * * * *